United States Patent
Takeda et al.

(10) Patent No.: US 10,651,982 B2
(45) Date of Patent: May 12, 2020

(54) USER TERMINAL, RADIO BASE STATION, AND RADIO COMMUNICATION METHOD

(71) Applicant: NTT DOCOMO, INC., Tokyo (JP)

(72) Inventors: Kazuaki Takeda, Tokyo (JP); Kazuki Takeda, Tokyo (JP); Satoshi Nagata, Tokyo (JP); Qin Mu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/075,541

(22) PCT Filed: Feb. 3, 2017

(86) PCT No.: PCT/JP2017/004016
§ 371 (c)(1),
(2) Date: Aug. 3, 2018

(87) PCT Pub. No.: WO2017/135420
PCT Pub. Date: Aug. 10, 2017

(65) Prior Publication Data
US 2019/0007174 A1    Jan. 3, 2019

(30) Foreign Application Priority Data
Feb. 4, 2016 (JP) .................................. 2016-020311

(51) Int. Cl.
*H04L 1/18* (2006.01)
*H04W 72/04* (2009.01)
*H04W 28/04* (2009.01)
*H04B 1/713* (2011.01)
*H04L 5/00* (2006.01)

(52) U.S. Cl.
CPC .......... *H04L 1/1854* (2013.01); *H04B 1/713* (2013.01); *H04L 1/1861* (2013.01); *H04L 5/0055* (2013.01); *H04W 28/04* (2013.01); *H04W 72/04* (2013.01); *H04W 72/0406* (2013.01); *H04W 72/0453* (2013.01)

(58) Field of Classification Search
CPC . H04W 72/0406; H04W 28/04; H04W 72/04; H04L 5/0055; H04L 1/1854; H04L 1/1861

See application file for complete search history.

(56) References Cited

U.S. PATENT DOCUMENTS

2017/0311326 A1*  10/2017  Wong ................ H04W 72/0453

OTHER PUBLICATIONS

Nokia Networks; "Uplink Control Information for NB-IoT"; 3GPP TSG-RAN WG1 NB-IoT Adhoc, R1-160009; Budapest, Hungary; Jan. 18-20, 2016 (2 pages).
Nokia Networks; "DCI design for NB-IoT"; 3GPP TSG-RAN WG1 NB-IoT Adhoc, R1-160017; Budapest, Hungary; Jan. 18-20, 2016 (3 pages).

(Continued)

Primary Examiner — Gbemileke J Onamuti
(74) Attorney, Agent, or Firm — Osha Liang LLP

(57) ABSTRACT

Disclosed is to properly perform retransmission control of a downlink signal (e.g., a downlink shared channel) in a future radio communication system. The present invention provides a user terminal comprising a reception section that receives downlink control information and a control section that determines, based on the downlink control information, a single subcarrier that is used for transmission of retransmission control information of a downlink shared channel.

13 Claims, 15 Drawing Sheets

(56) References Cited

OTHER PUBLICATIONS

MediaTek Inc; "Considerations on uplink control information"; 3GPP TSG RAN WG1 NB-IoT Ad-Hoc Meeting, R1-160168; Budapest, Hungary; Jan. 18-20, 2016 (4 pages).

NTT DOCOMO; "Views on UL ACK/NACK transmissions for NB-IoT"; 3GPP TSG RAN WG1 NB-IoT Ad-Hoc Meeting, R1-161023; St Julian's, Malta; Feb. 15-19, 2016 (3 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

3GPP TR 36.888 V12.0.0; "3rd Generation Partnership Project; Technical Specification Group Radio Access Network; Study on provision of low-cost Machine-Type Communications (MTC) User Equipments (UEs) based on LTE (Release 12)"; Jun. 2013 (55 pages).

International Search Report issued in PCT/JP2017/004016 dated Mar. 28, 2017 (2 pages).

Written Opinion issued in PCT/JP2017/004016 dated Mar. 28, 2017 (3 pages).

Office Action issued in the counterpart Japanese Patent Application No. 2016-020311, dated Mar. 28, 2017 (9 pages).

Extended European Search Report issued in the counterpart European Patent Application No. 17747571.2, dated Dec. 20, 2018 (12 pages).

Huawei, HiSilicon; "NB-PUSCH design"; 3GPP TSG RAN WG1 NB-IoT Ad-Hoc Meeting R1-160034; Budapest, Hungary, Jan. 18-20, 2016 (6 pages).

Huawei, HiSilicon; "DCI for NB-Iot"; 3GPP TSG RAN WG1 NB-Iot Ad-Hoc Meeting R1-160032; Budapest, Hungary, Jan. 18-20, 2016 (3 pages).

3GPP TSG-RAN WG4 Meeting #77 NB-IoT Ad hoc; R4-77AH-IoT-0008; "Considerations on Channel Raster for NB-IoT" ZTE; Jan. 20-22, 2016; Budapest, Hungary (6 pages).

Office Action issued in European Application No. 17747571.2; dated Oct. 21, 2019 (8 pages).

\* cited by examiner

| | Number of tones | 15kHz-subcarrier | 3.75kHz-subcarrier |
|---|---|---|---|
| Single tone | 1 | 8 msec | 32 msec |
| Multi-tone | 3 | 4 msec | |
| | 6 | 2 msec | |
| | 12 | 1 msec | |

FIG. 2

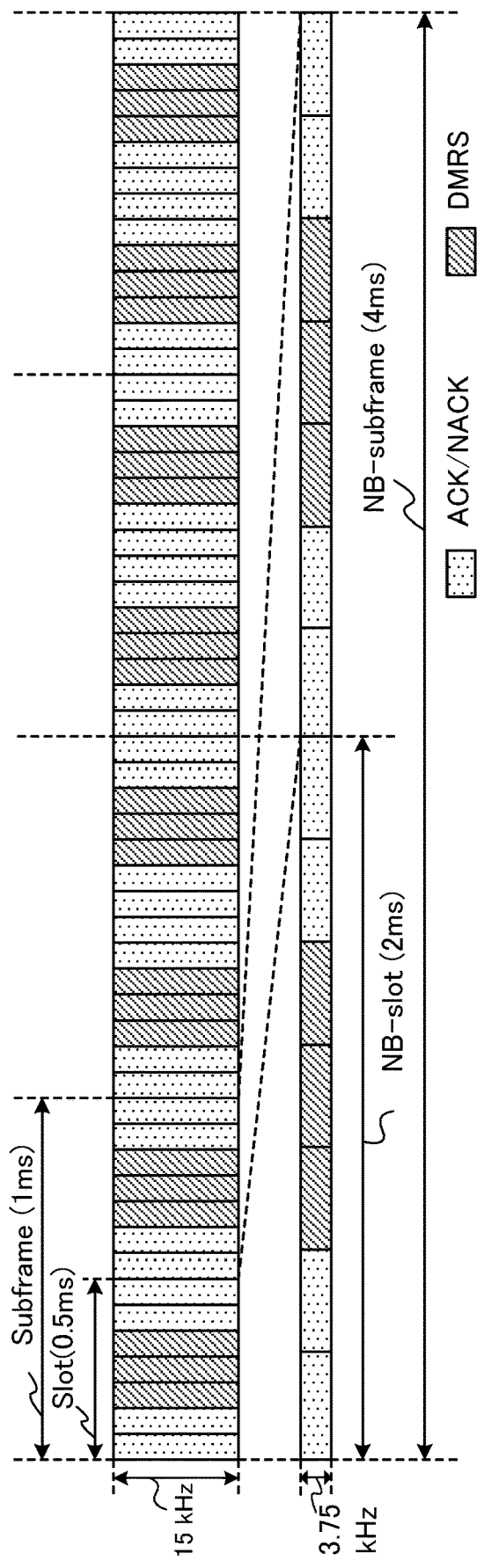
FIG. 7A
FIG. 7B

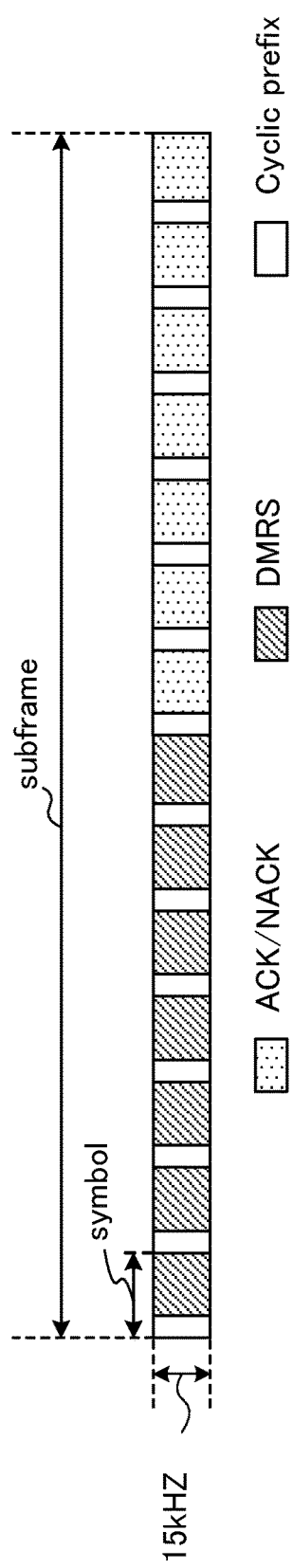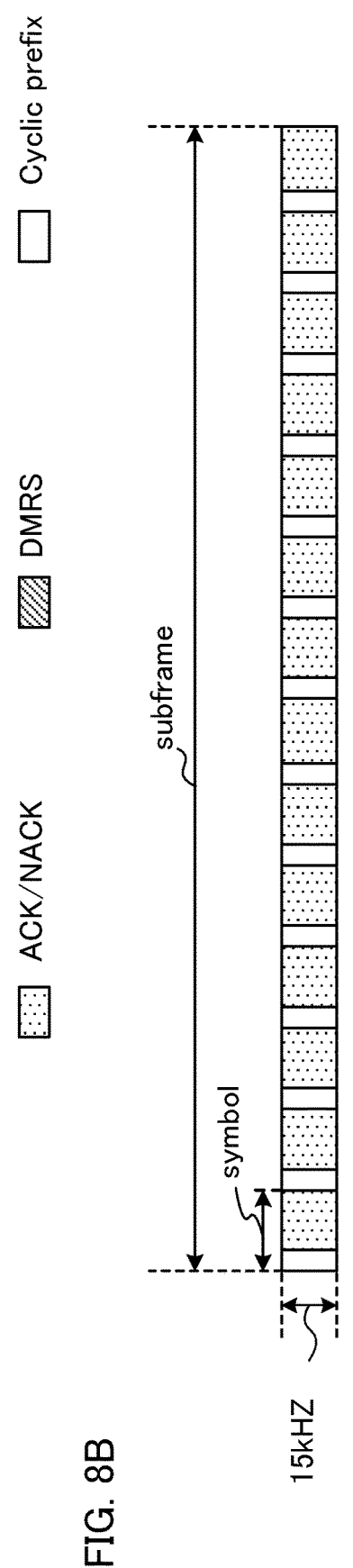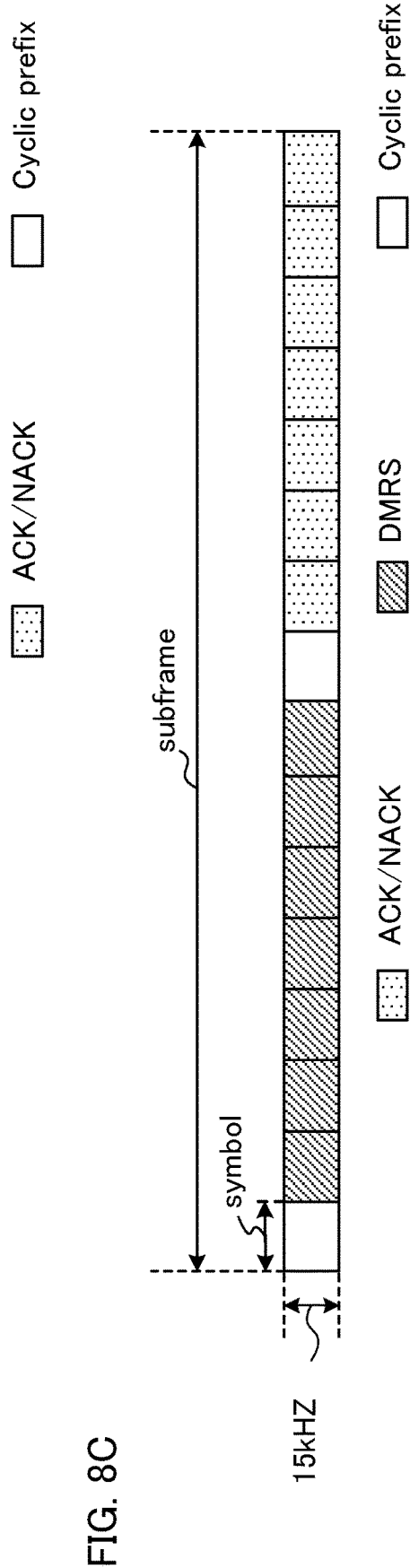

USER TERMINAL, RADIO BASE STATION, AND RADIO COMMUNICATION METHOD

TECHNICAL FIELD

The present invention pertains to a user terminal, a radio base station and a radio communication method in a next generation mobile communication system.

BACKGROUND ART

A Long Term Evolution (LTE) (Non-patent document 1) was standardized for the purpose of attaining a much faster data rate and decreasing a delay in a UMTS (Universal Mobile Telecommunications System) network. An examination of a succeeding system (called, e.g., LTE-A (LTE-Advanced), FRA (Future Radio Access), 4G (4th generation mobile communication system) 5G, LTE Releases.13, 14, 15)) is underway in order to aim at attaining a much broader band and greater acceleration than the LTE.

Over the recent years, with decreased costs for communication apparatuses, there has been actively developed a technology of a machine-to-machine (M2M: Machine-to-Machine) communication, by which apparatuses connected to a network conduct automatic control by performing mutual communications without human hands. In particular, 3GPP (Third Generation Partnership Project) accelerates standardization for optimizing an MTC (Machine Type Communication) as a cellular system for the machine-to-machine communication in the M2M (Non-patent document 2). It is considered that user terminal for the MTC (MTC UE (User Equipment)) is utilized for a wide range of fields such as an electric meter, a gas meter, a vending machine, a vehicle and other industrial apparatuses.

CITATION LIST

Non-Patent Documents

[Non-Patent Document 1] 3GPP TS 36.300 V8.12.0 "Evolved Universal Terrestrial Radio Access (E-UTRA) and Evolved Universal Terrestrial Radio Access Network (E-UTRAN); Overall description; Stage 2", April 2010

[Non-Patent Document 2] 3GPP TR 36.888 V12.0.0 "Study on provision of low-cost Machine-Type Communications (MTC) User Equipments (UEs) based on LTE (Release 12)", June 2013

SUMMARY OF THE INVENTION

Technical Problem

In MTC, there is an increased demand for user terminals (also referred to as LC (Low-Cost)-MTC user terminal (LC-MTC UE (user equipment))) attainable by a simple hardware constitution in terms of reducing costs and improving a coverage area in the cellular system. LTE communication in a very narrow band (which may be called, e.g., NB-IoT (Narrow Band Internet of Things), NB-LTE (Narrow Band LTE), NB cellular IoT (Narrow Band cellular Internet of Things), a clean slate (clean slate)) is examined as a communication system of the user terminal. Hereinafter, the term "NB-IoT" written in the present specification is to encompass the NB-LTE, the NB cellular IoT and the clean slate.

It is assumed that a usage bandwidth of the user terminal (also referred to as NB-IoT user terminal (NB-IoT UE)) supporting the NB-IoT is restricted to a bandwidth (e.g., 180 kHz, one resource block (also called RB: Resource Block, PRB: Physical Resource Block)) narrower than the minimum system bandwidth (1.4 MHz) of an existing LTE system (e.g., the LTE system before Rel.12).

Thus, in an uplink transmission of the NB-IoT with a usage bandwidth being restricted to the narrow band as compared with the existing LTE system, it is examined to support a transmission using a single subcarrier (tone) (single-tone transmission) and a transmission using multiple subcarriers (multiple-tone transmission).

The NB-IoT, which supports single-tone transmission in the uplink transmission, has a problem regarding how a downlink signal (e.g., a downlink shared channel (PDSCH: Physical Downlink Shared Channel)) is transmitted. The uplink transmission of the existing LTE system does not support single-tone transmission, and hence, when a transmission method of retransmission control information of the existing LTE system is applied directly to the NB-IoT supporting single-tone transmission, there may arise an apprehension of being unable to properly conduct the retransmission control of the downlink signal.

It is one object of the present invention, which was conceived in view of the points described above, to provide a user terminal, a radio base station and a radio communication method each capable of properly performing retransmission control of a downlink signal (e.g., a downlink shared channel) in a future radio communication system.

Means for Solving the Problems

The present invention provides a user terminal has a reception section that receives downlink control information; and a control section that determines, based on the downlink control information, a single subcarrier that is used for transmission of retransmission control information of a downlink shared channel.

Advantageous Effects of the Invention

According to the present invention, it is feasible to properly perform the retransmission control of the downlink signal (e.g., the downlink shared channel) in the future radio communication system.

BRIEF DESCRIPTION OF THE DRAWINGS

FIG. 2 is a diagram illustrating one example of a resource unit in the NB-IoT.

FIGS. 3A and 3B are diagrams each illustrating an example of a constitution of a PUCCH format 1a.

FIGS. 7A and 7B are explanatory diagrams of one example of a subcarrier interval according to a modified example of the first embodiment.

FIGS. 8A to 8C are diagrams each illustrating an example of a constitution of a new PUCCH format according to the modified example of the first embodiment.

DESCRIPTION OF EMBODIMENTS

An examination of simplifying, though allowing a decline of throughput, a hardware constitution of an NB-IoT user terminal, is underway. For example, as compared with existing user terminal (LTE terminal before Rel.12), It is cons that a decrease in peak rate, a restriction of transport block size (TBS: Transport Block Size), a restriction of resource blocks (also called RB: Resource Block, or PRB: Physical Resource Block) and a restriction of reception RF (Radio Frequency) are applied to the NB-IoT user terminal.

Unlike the LTE terminal with an upper limit of usage bandwidth being set to a system bandwidth (e.g., 20 MHz (100 RB), one component carrier), the upper limit of the usage bandwidth of the NB-IoT user terminal is restricted to a predetermined narrow band (NB: Narrow Band, e.g., 180 kHz, 1.4 MHz). For example, the predetermined narrow band may be the same as or part (e.g., 180 kHz, 1 PRB) of a minimum system bandwidth (e.g., 1.4 MHz, 6 PRB) of the existing LTE system (the LTE system before Rel.12, which will hereinafter be referred to as simply the LTE system).

Thus, the NB-IoT user terminal is said to be terminal being narrower in upper limit of the usage bandwidth than that of the existing LTE terminal, i.e., terminal enabled to transmit and/or receive (which will hereinafter be referred to as "transmit/receive" or "transmission/reception") at a narrower bandwidth (narrower than, e.g., 1.4 MHz) than that of the existing LTE terminal. It is considered that the NB-IoT user terminal is constituted to operate within the system bandwidth of the LTE system by taking account of backward compatibility with the existing LTE system. For example, frequency multiplexing may be supported between the NB-IoT user terminal with the bandwidth being restricted and the existing LTE terminal with the bandwidth not being restricted in the system bandwidth of the LTE system. The NB-IoT may be operated not only within the LTE system bandwidth, but also by using a guard band between a self-carrier and another carrier neighboring the LTE system bandwidth, and also using a dedicated frequency ( ).

Figure 1:
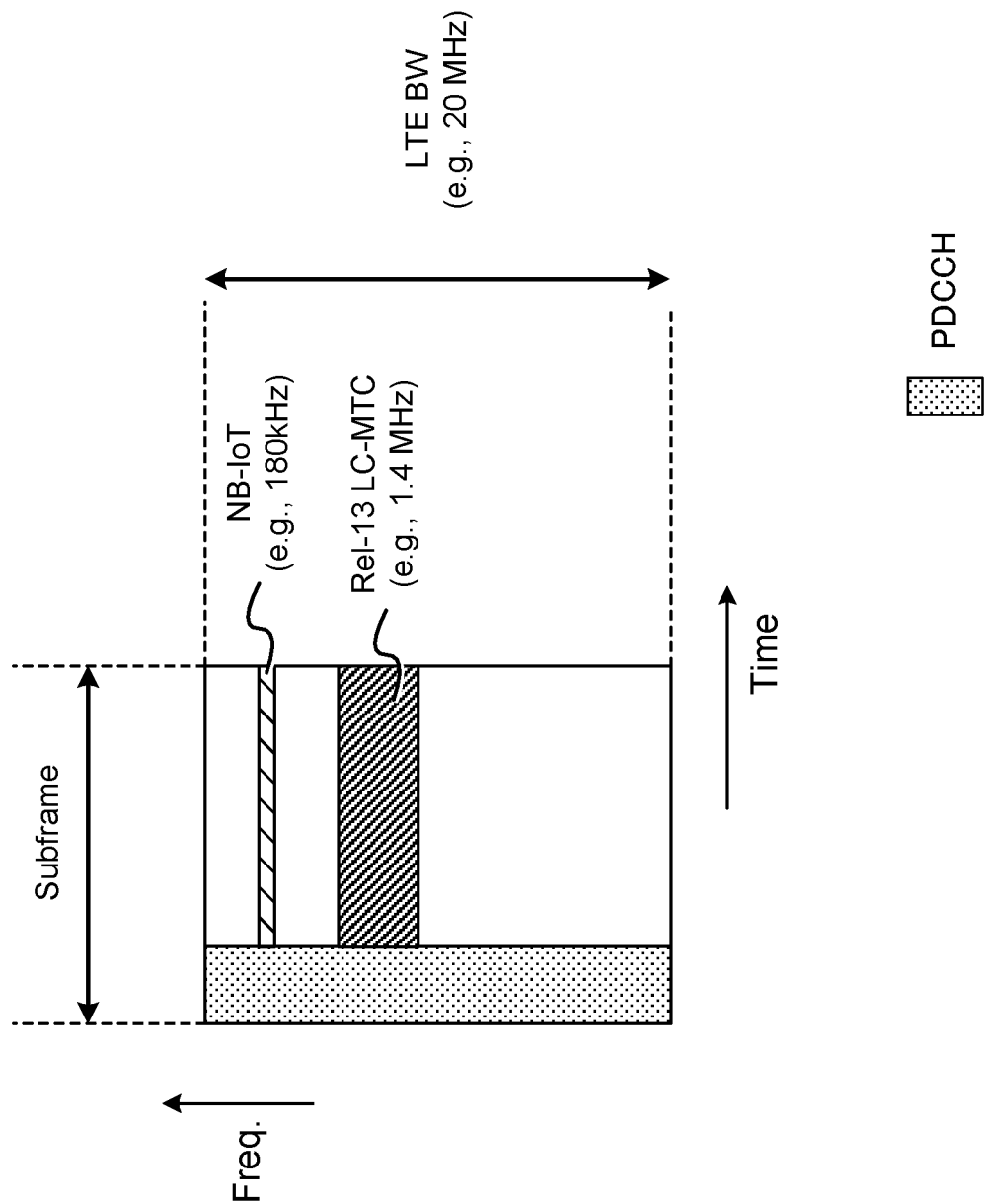
FIG. 1 is an explanatory diagram of a usage bandwidth of an NB-IoT user terminal.

FIG. 1 is a diagram illustrating an allocation example of the narrow band serving as the usage bandwidth of the NB-IoT user terminal. In FIG. 1, the usage bandwidth of the NB-IoT user terminal is set in part of the system bandwidth (e.g., 20 MHz). Note that the usage bandwidth of the NB-IoT user terminal is set to 180 KHz from FIG. 1 onward, but the embodiment is not limited to this value. It may be sufficient that the usage bandwidth of the NB-IoT user terminal be narrower than the system bandwidth (e.g., 20 MHz) of the LTE system, and is equal to or smaller than a usage bandwidth (e.g., 1.4 MHz) of LC-MTC terminal of, e.g., Rel.13.

It is preferable that a frequency position of the narrow band serving as the usage bandwidth of the NB-IoT user terminal be constituted to be variable within the system bandwidth. For example, it is preferable that the NB-IoT user terminal performs communications through use of a radio resource different for each predetermined period (e.g., per subframe). Traffic offloading and a frequency diversity effect for the NB-IoT user terminal can be thereby attained, and frequency usage efficiency is also thereby prevented from decreasing. It is therefore preferable that the NB-IoT user terminal have an RF retuning function by taking account of applying frequency hopping and frequency scheduling.

The NB-IoT user terminal may use different bands for an uplink and a downlink, and may also use the same band. The band used for the downlink transmission/reception may be called a downlink narrow band (DL NB: Downlink Narrow Band). The band used for the uplink transmission/reception may be called an uplink narrow band (UL NB: Uplink Narrow Band).

The NB-IoT user terminal receives downlink control information (DCI: Downlink Control Information) via a downlink control channel allocated in the narrow band. The downlink control channel may be called PDCCH (Physical Downlink Control Channel), may also be called EPDCCH (Enhanced Physical Downlink Control Channel), and may further be called M-PDCCH (MTC PDCCH), NB-PDCCH and other equivalent channels.

The NB-IoT user terminal receives downlink data via the downlink shared channel allocated to the narrow band. The downlink shared channel may be called PDSCH (Physical Downlink Shared Channel), may also be called M-PDSCH (MTC PDSCH), and may further be called NB-PDSCH.

The NB-IoT user terminal transmits uplink control information (UCI: Uplink Control Information) via an uplink control channel allocated to the narrow band. The UCI contains retransmission control information and/or channel state information (CSI: Channel State Information) of an uplink signal. The retransmission control information is information used for the retransmission control of the downlink signal (e.g., the downlink shared channel), and is at least of one (which will hereinafter be termed ACK/NACK) ACK (ACKnowledge), NACK (Non-ACKnowledge) and DTX (Discontinuous Transmission). The retransmission control information is also called HARQ-ACK (Hybrid Automatic Repeat reQuest-ACKnowledge). The uplink control channel may be called PUCCH (Physical Uplink Control Channel) and may also be called M-PUCCH (MTC PUCCH) or NB-PUCCH.

The NB-IoT user terminal receives the UCI or/and the uplink data via the uplink shared channel allocated to the narrow band. The uplink shared channel may be called PUSCH (Physical Uplink Shared Channel), and may also be called M-PUSCH (MTC PUSCH) or NB-PUSCH.

The channels may be, without being limited to the channels described above, expressed by being marked with "M" representing the MTC as conventional channels used for the same application and "N" or "NB" representing the NB-IoT. In the following discussion, the downlink control channel, the downlink shared channel, the uplink shared channel and the uplink shared channel are respectively called PDCCH, PDSCH, PUCCH and PUSCH, but the embodiment is not, however, limited to these terms as described above.

The NB-IoT enables a repetitive transmission/reception scheme of repetitively transmitting and receiving the same downlink signals (e.g., PDCCH, PDSCH and other equivalent channels) and/or the same uplink signals (e.g., PUCCH, PUSCH and other equivalent channels) over a plurality of subframes in order to enhance coverage. A subframe count (number of subframes) of the plurality of subframes, over which the same downlink and/or uplink signals are transmitted and received, is also called a repetition count (a number of repetitions). The repetition count may be indicated by a repetition level. The repetition level may also be called a coverage enhancement (CE: Coverage Enhancement) level.

An examination is underway wherein the NB-IoT described above supports a transmission (single-tone transmission) using a single subcarrier and a transmission (multiple-tone transmission) using a plurality of subcarriers in the uplink transmission. The "tone" given herein has the same meaning as the subcarrier, and denotes each of the bandwidths into which the usage bandwidth (e.g., 180 kHz, one resource block) is divided.

It is considered that the single-tone transmission supports the same subcarrier interval (i.e., 15 kHz) as that of the existing LTE system, and a subcarrier interval (e.g., 3.75 kHz) narrower than that of the LTE system. It is considered that the multiple-tone transmission supports the same subcarrier interval (i.e., 15 kHz) as that of the LTE system. When the subcarrier interval is 15 kHz, 1 PRB (180 kHz) is constituted by 12 subcarriers. When the subcarrier interval is 3.75 kHz, 1 PRB is constituted by 48 subcarriers.

It is also considered that the NB-IoT user terminal performs the uplink transmission (e.g., the transmission via the PUSCH or/and the PUCCH) with a subcarrier (tone) count (a number of subcarriers (tones)) signaled from the radio base station. It is considered that a combination of the subcarrier counts is instanced by $\{1, 3, 6, 12\}$. Thus, the subcarrier count selected from within the predetermined combination is set (constituted) by higher-layer signaling (e.g., RRC (Radio Resource Control) signaling and broadcast information), and the NB-IoT user terminal may perform the uplink transmission with the set (constituted) subcarrier count.

FIG. 2 is a diagram illustrating one example of a resource unit in the NB-IoT. FIG. 2 illustrates an example of using $\{1, 3, 6, 12\}$ as the combination of the subcarrier (tone) counts, but the embodiment is not limited to this combination of the tone counts. For example, a combination $\{1, 2, 4, 12\}$ may also be used.

As illustrated in FIG. 2, a time unit of one resource unit is changed corresponding to the subcarrier (tone) count of the subcarriers constituting one resource unit. Specifically, the time unit constituting one resource unit elongates corresponding to a decrease in subcarrier count and/or the subcarrier interval of the subcarriers constituting one resource.

For example, in FIG. 2, when the subcarrier interval is 15 kHz, which is the same as that of the existing LTE system, and when the tone counts are 12, 6, 3 and 1, the time unit of one resource unit becomes 1 ms, 2 ms, 4 ms and 8 ms. When the subcarrier interval is 3.75 kHz, which is one-fourth (¼) that of the existing LTE system, and when the tone count is 1, the time unit of one resource unit becomes 32 ms.

Note that one transport block (TB: Transport Block) defined as a unit of data storage may be mapped to one resource unit, and may also be mapped to a plurality of resource units in FIG. 2. The resource unit described above is applicable to not only the uplink transmission but also the downlink transmission.

It is desirable that the NB-IoT user terminal transmit the retransmission control information (e.g., ACK/NACK) of the downlink signal to the radio base station. It is assumed that the transmission of the retransmission control information supports the subcarrier intervals of both of 15 kHz and 3.75 kHz.

It is assumed that a method of transmitting the retransmission control information involves using, e.g., a PUSCH transmission method (such as a coding method, a modulation method, or a resource mapping method) using the single or plural subcarriers in the NB-IoT. However, when transmitting the retransmission control information of a small bit count (e.g., 1 bit) by use of the PUSCH transmission method employing the single or plural subcarriers, there is an apprehension of being unable to acquire a gain of a turbo code. Further, it follows that a 24-bit cyclic redundancy check (CRC: Cyclic Redundancy Check) is attached for error detection of the ACK/NACK of the small bit count, resulting in an apprehension of causing a rise in overhead.

Alternatively, it is assumed that a PUCCH format 1a of the existing LTE system is used as the method of transmitting the retransmission control information. FIG. 3 is a diagram illustrating an example of a constitution of the PUCCH format 1a. The PUCCH format 1a is used for transmitting the ACK/NACK of 2 bits at the maximum in the existing LTE system.

Figure 3A:
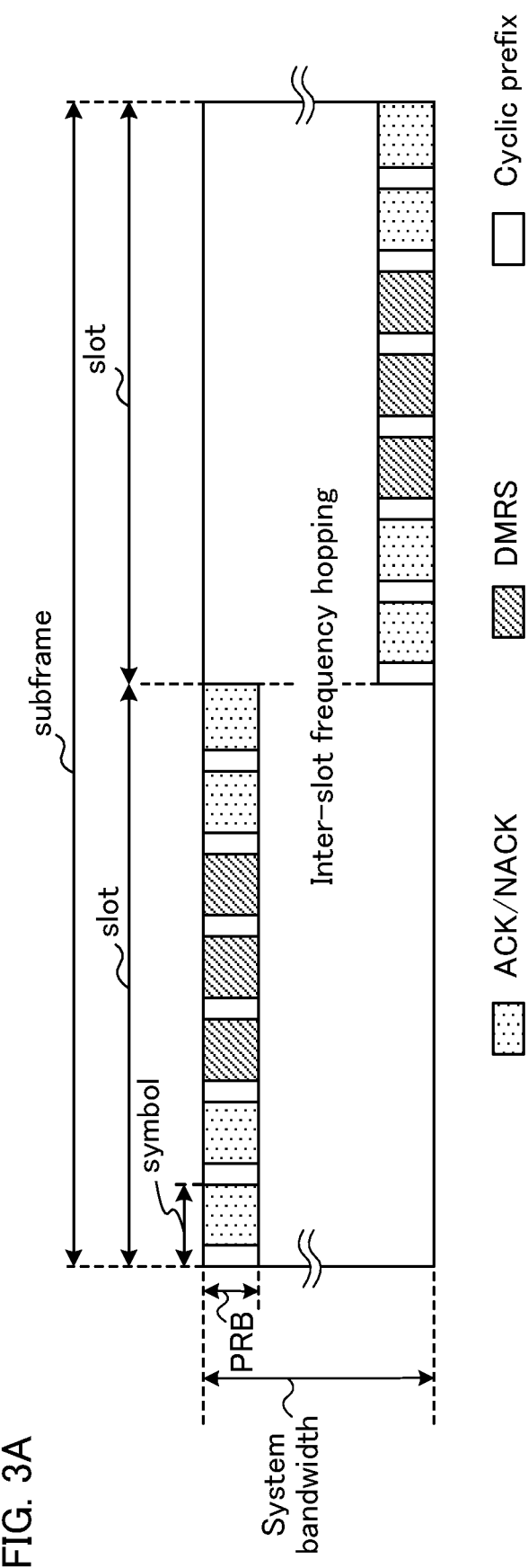

As depicted in FIG. 3A, in the PUCCH format 1a, 3 central symbols of each slot are used as a demodulation reference signal (DMRS: DeModulation Reference Signal), and the remaining 4 symbols are used as the ACK/NACK. The 3 symbols for the DMRS are also called reference signal (RS: Reference Signal) symbols or DMRS symbols, and the symbols for the ACK/NACK are also called information symbols, ACK/NACK symbols or data symbols.

In the PUCCH format 1a, frequency hopping is applied between the slots within the subframe. The "frequency hopping" given herein denotes "hopping an allocation resource to frequency positions being symmetric about a central frequency of the usage bandwidth (e.g., the system bandwidth, 1 component carrier (CC)) of the user terminal".

Figure 3B:
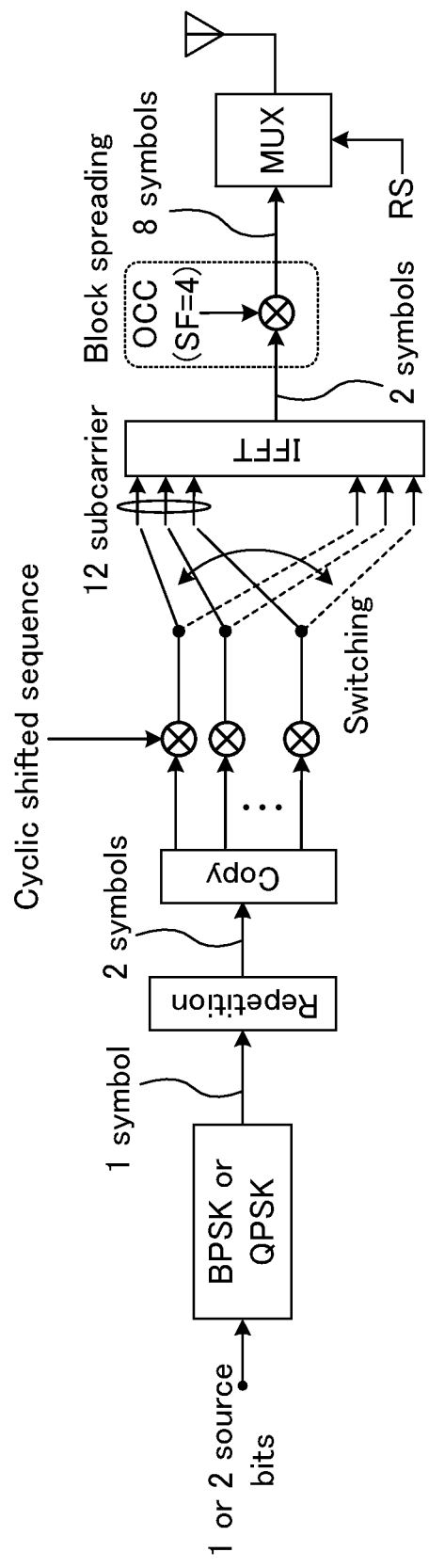

As illustrated in FIG. 3B, the user terminal modulates the 1- or 2-bit ACK/NACK into 1 modulation symbol by BPSK (Binary Phase Shift Keying) or QPSK (Quadrature Phase Shift Keying), and repeats the modulation for the 2 slots of the first half and the second half. The user terminal copies the 2 modulation symbols of the 2 slots for the 4 information symbols within each slot, and a cyclic shift (phase rotation) using a cyclic shifted sequence (Cyclic Shifted Sequence) is applied.

The user terminal converts the signal ( ) in a frequency domain into symbols in a time domain by inputting the signal to the 12 subcarriers (corresponding to 1 PRB) in given positions of an inverse fast Fourier transform (IFFT: Inverse Fast Fourier Transform) having a frequency bandwidth encompassing the system bandwidth. The positions of the 12 subcarriers are switched over so that the frequency hopping is applied between the slots.

The user terminal multiplies the converted symbols in the time domain, which correspond to the slots, by an orthogonal sequence $[W_0, \ldots, W_{N-1}]$ (e.g., OCC: Orthogonal Cover Code) having a sequence length equal to the number of information symbols (symbol count) (N) of each slot, thereby block-spreading the symbols to the whole of the information symbols within each slot. As illustrated in FIG. 3A, in the PUCCH format 1a, the 4 information symbols are provided within each slot, and hence the user terminal multiplexes the 4 information symbols with the 3 DMRS symbols in each slot by multiplying the symbols outputted from the IFFT by the OCC having a sequence length "4".

As described above, in the PUCCH format 1a, the ACKs/NACKs of a plurality of pieces of user terminal are multiplexed by code division multiplexing (CDM: Code Division Multiplexing) based on the cyclic shift in a frequency domain and by the CDM based on the block spreading in a time domain.

However, as illustrated in FIGS. 3A and 3B, the PUCCH format 1a described above, assumes not single-tone transmission using the single subcarrier but transmission using the 12 subcarriers (1 PRB). Accordingly, when the NB-IoT user terminal performs single-tone transmission of the retransmission control information, it is unfeasible to apply the PUCCH format 1a as is. When the NB-IoT user terminal performs multiple tone transmission of the retransmission control information, there is an apprehension that a peak-to-average power ratio (PAPR: Peak-to-Average Power Ratio) increases.

Such being the case, the present inventors examined a method of transmitting the retransmission control information of the downlink signal in a future radio communication system that supports single-tone transmission, and reached the present invention. Specifically, the present inventors conceived an idea (a first embodiment) of transmitting the retransmission control information by using a new PUCCH format, and an idea (a second embodiment) of causing the retransmission control information to be recognized from whether the tone transmission is conducted or not, and reached the present invention.

A detailed description of one embodiment of the present invention will be made with reference to the drawings. Note that the following discussion assumes that the usage bandwidth of the user terminal is restricted to 180 kHz (1 PRB) defined as a bandwidth narrower than the minimum system bandwidth (1.4 MHz) of the existing LTE system, but the embodiment is not limited to this bandwidth.

The following discussion will exemplify an example wherein the subcarrier interval is 15 kHz, and 180 kHz is constituted by 12 subcarriers, but the embodiment is not limited to this example. The present embodiment is properly applicable to, e.g., an example that the subcarrier interval is 3.75 kHz, and 180 kHz is constituted by 48 subcarriers. Note that the time length of the 1 resource unit may be varied corresponding to the subcarrier interval as explained in FIG. 2.

The following discussion will describe an example of allocating the single subcarrier used for single-tone transmission, but the embodiment is not limited to this example. The embodiment is properly applicable to multiple-tone transmission in a frequency unit (e.g., 3 or 6 subcarriers) smaller than 1 PRB (180 kHz).

The retransmission control information transmission method according to the embodiment is applicable to, without being limited to the NB-IoT, a 5G radio access method (New RAT (Radio Access Technology), e.g., a constitution using a reduced TTI shorter than a normal transmission time interval (TTI: Transmission Time Interval)), and also to IoT with the usage bandwidth not being limited to the narrow band. In other words, the subframe length, the symbol count constituting the subframe and the symbol count constituting the slot may be properly changed in the embodiment.

The user terminal according to the embodiment determines a transmission resource (which is a PUCCH resource for the new PUCCH format in the first embodiment, or a transmission resource in the second embodiment) constituted by the single subcarrier, and transmits the retransmission control information of the downlink signal by using the determined transmission resource.

First Embodiment

In the first embodiment, the user terminal transmits the retransmission control information by use of the new PUCCH format suited to single-tone transmission. In the new PUCCH format, the ACKs/NACKs of the plurality of pieces of user terminal are frequency-division-multiplexed (FDM: Frequency Division Multiplexing)) on a subcarrier (tone) basis, and the multiplexed ACK/NACK of each piece user terminal is transmitted by employing the single subcarrier.

In the new PUCCH format, the orthogonal spreading in the time domain and/or the frequency domain may be applied by using the orthogonal sequence to the ACKs/NACKs of the plural pieces of user terminal, which are transmitted by employing the same subcarrier. The following discussion will describe an example of applying the orthogonal spreading (block spreading) in the time domain by way of one example, but the orthogonal spreading may not be applied. The positions and number of the DMRS symbols are not limited to those illustrated in FIG. 4.

<New PUCCH Format>

Figure 4A:
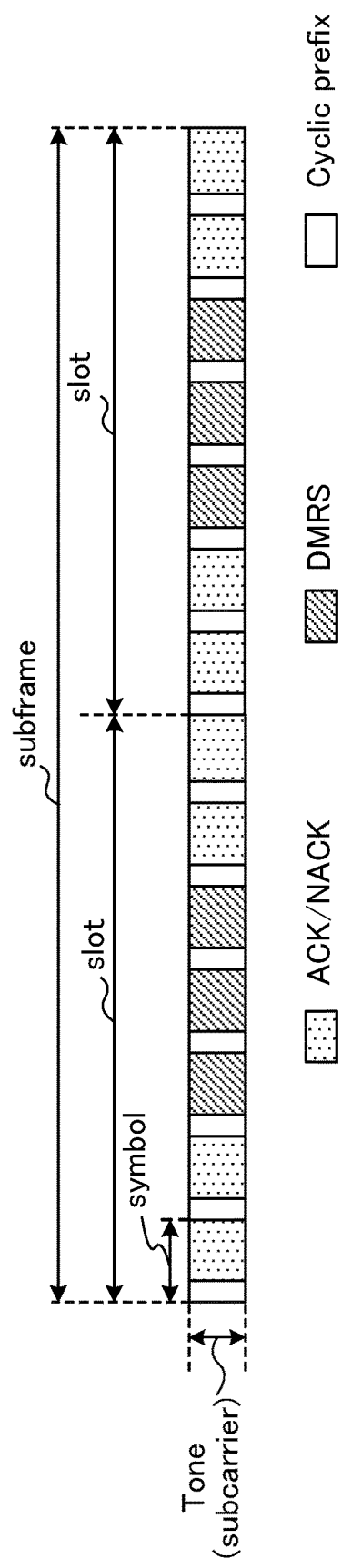
FIGS. 4A and 4B are diagrams each illustrating an example of a constitution of a new PUCCH format according to a first embodiment.

FIG. 4 is a diagram illustrating an example of a constitution of the new PUCCH format according to the first embodiment. For example, as depicted in FIG. 4A, in the new PUCCH format, the 3 central symbols of each slot are used as the DMRS symbols, and the DMRS may be mapped to the 3 DMRS symbols. The remaining 4 symbols of each slot are used as the information symbols, and the ACK/NACK may be mapped to the 4 information symbols. Note that as will be described in detail in FIG. 8, the number and positions of the DMRS symbols constituting the new PUCCH format are not limited to these given above.

As illustrated in FIG. 4A, in the new PUCCH format, frequency hopping may not be applied between the slots within the subframe. As illustrated in FIG. 3A, the user terminal is, when able to use the system bandwidth, able to acquire a frequency diversity effect owing to the frequency hopping between the slots. By contrast, when the usage bandwidth of the user terminal is restricted to a given narrow band (e.g., 180 kHz), it is assumed that a large frequency diversity effect is not acquired even by applying frequency hopping between the slots within the narrow band.

Accordingly, as illustrated in FIG. 4A, in the new PUCCH format, the same subcarrier may be used between the slots without applying frequency hopping between the slots within the subframe. Note that when performing the PUCCH transmission over the plurality of subframes for coverage enhancement (CE), frequency hopping may also be applied between the plural subframes within the narrow band.

Figure 4B:
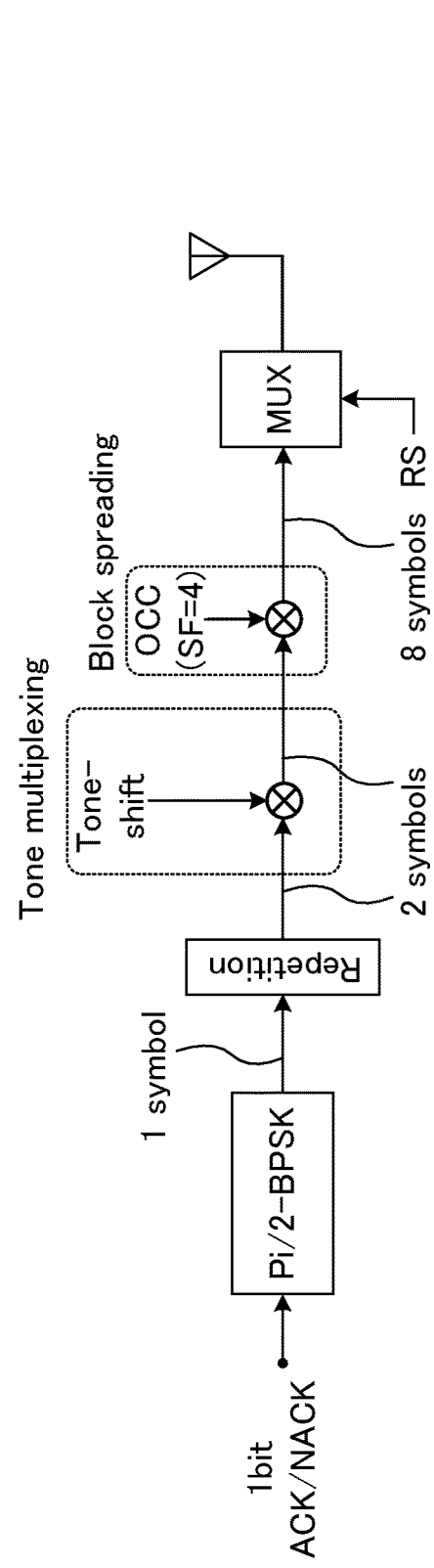

As illustrated in FIG. 4B, the user terminal may modulate 1-bit ACK/NACK by Pi/2-BPSK (Π/2-BPSK, Π/2 shift BPSK). The Pi/2-BPSK is defined as a modulation scheme using alternating BPSK schemes with phases different through 90 degrees (Π/2 radians) mutually per modulation (1 symbol). Note that the normal BPSK or QPSK, Pi/4-

QPSK (Π/4-QPSK, Π/4 shift QPSK) and QAM (Quadrature Amplitude Modulation) may be used as the ACK/NACK modulation methods.

The user terminal may map (multiplication of a phase for a tone shift) the 2 modulation symbols for the 2 slots to the single subcarrier (tone) by repeating the1 modulation symbol for the 2 slots, i.e., the slot for the first half and the slot for the second half. The user terminal may multiply the modulation symbols of each slot by the orthogonal sequence (also termed an orthogonal code, and an orthogonal spreading code) [$W_0, \ldots, W_{N-1}$] (e.g., OCC) having the sequence length (which is herein "4") equal to the information symbol count (N), and may thus orthogonal-spread (block-spread) the symbols to the whole of the information symbols within each slot.

As illustrated in FIG. 4A, when the 4 information symbols are provided in each slot in the new PUCCH format, the user terminal may multiplex the 4 information symbols with the 3 DMRS symbols in each slot (may multiply the 8 information symbols per subframe with the 3 DMRS symbols) by multiplying the modulation symbols of each slot by the OCC having the sequence length 4.

The new PUCCH format described above enables the transmission of the ACKs/NACKs of the 36 pieces of user terminal at the maximum in the same subframe by the frequency division multiplexing on the subcarrier basis and the orthogonal spreading in the time domain.

Note that FIGS. 4A and 4B illustrate an example of attaching a normal cyclic prefix (CP) to each symbol, and the new PUCCH format is, however, properly applicable to an example of attaching an extended CP to each symbol as well. When using the extended CP, 1 subframe may be constituted by 12 symbols, each slot may be constituted by 6 symbols, the 2 central symbols of each slot may be used as the DMRS symbols, and the remaining 4 symbols may be used as the information symbols. A guard period for adjusting to existing 1 ms may be provided between the slots. As will be described in detail in FIG. 8, in the new PUCCH format, the normal CP or the extended CP may not be attached to each symbol.

The repetition of the modulation symbols is applied in FIG. 4B but may not be applied. In this case, the user terminal maps 1 modulation symbol to the single subcarrier without the repetition, and may multiply the orthogonal sequence having a sequence length equal to the information symbol count (which is herein "8") within the subframe. In other words, orthogonal multiplexing (the block spreading) may be applied not between the information symbols within the slot but between the information symbols within the subframe.

<PUCCH Resource>

A radio resource (PUCCH resource) used in the new PUCCH format constituted above will be described. FIG. 5 is an explanatory diagram of one example of the PUCCH resource according to the first embodiment.

Figure 5A:
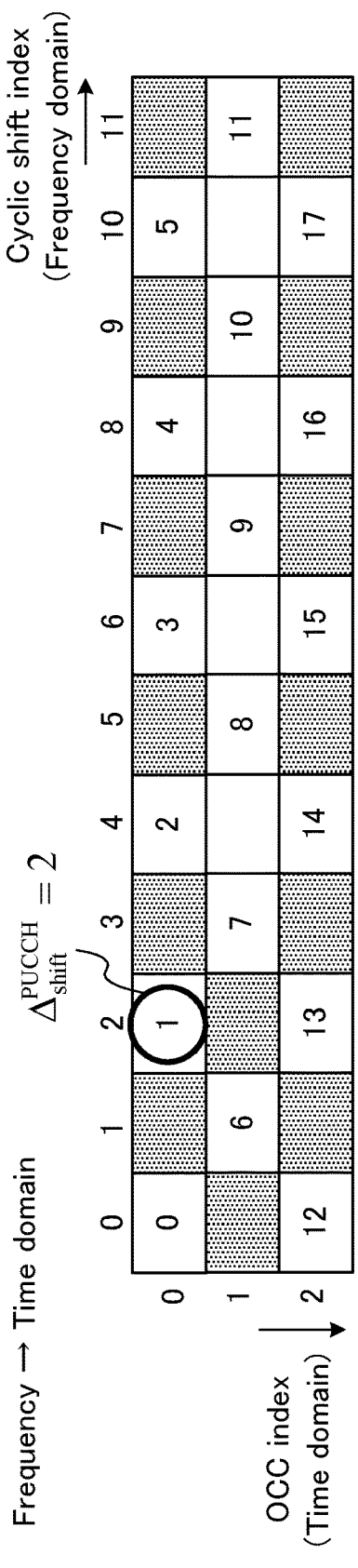
FIGS. 5A and 5B are diagrams each illustrating one example of the PUCCH resource according to the first embodiment.

FIG. 5A illustrates the PUCCH resource for the existing PUCCH format 1a. In FIG. 5A, the frequency domain indicates 12 types of cyclic shift (CS) sequences (e.g., CS sequences (which will hereinafter be denoted as CS sequences #0-#11) taking CS index values "0"-"11"), and the time domain indicates 3 types of orthogonal sequences (e.g., OCC sequences (which will hereinafter be denoted as CCC sequences #0-#2) taking OCC index values "0"-"2"). As illustrated in FIG. 5A, the PUCCH resource for the existing PUCCH format 1a is specified by a combination of the cyclic shift sequence and the orthogonal sequence.

In FIG. 5A, resource identifiers are allocated to the usable PUCCH resources in a sequential order from the frequency domain. For example, in FIG. 5A, the resource identifier "0" is allocated to the PUCCH resource constituted by the OCC sequence #0 and the CS index #0. Similarly, the resource identifiers "1", "2", "3", "4" and "5" are allocated to the PUCCH resources constituted by the OCC sequence #0 and the CS indexes #2, #4, #6, #8 and #10. The same is applied to the OCC sequences #1 and #2.

In FIG. 5A, the user terminal derives a CS index value and an OCC index value, based on the resource identifier derived according to a given rule and an offset value $\Delta^{PUCCH}_{shift}$ signaled by the higher-layer signaling. For instance, the user terminal derives a CS index value "2" and an OCC index value "0", based on a resource identifier "1" of the PUCCH resource and an offset value $\Delta^{PUCCH}_{shift}$ "2".

Figure 5B:
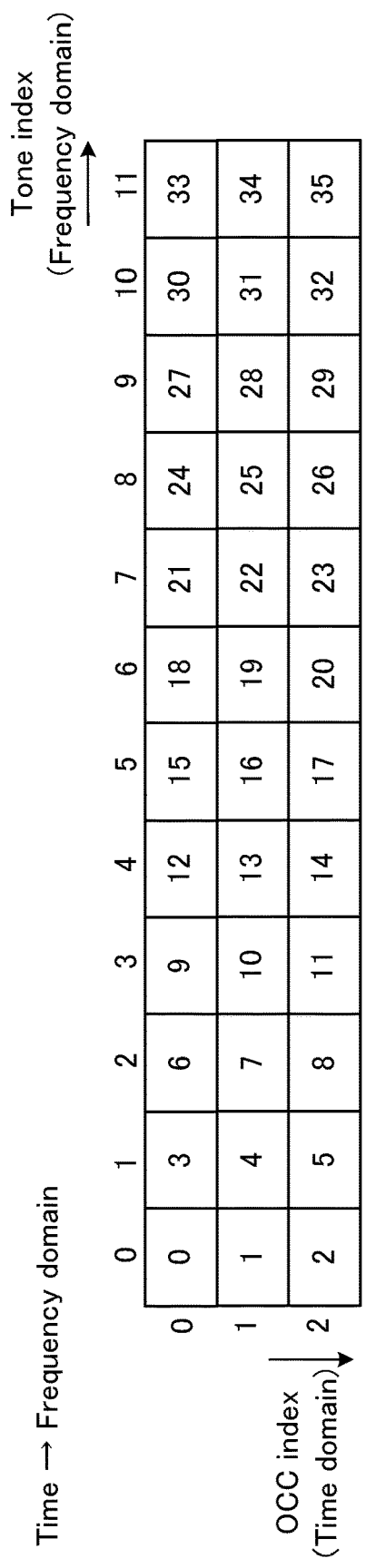

FIG. 5B illustrates the PUCCH resource for the new PUCCH format. In FIG. 5B, the frequency domain indicates 12 types of subcarriers (e.g., tones (subcarriers) taking tone index values "0"-"11"), and the time domain indicates 3 types of orthogonal sequences. As illustrated in FIG. 5B, the PUCCH resource for the new PUCCH format is specified by a combination of the subcarrier (tone) and the orthogonal sequence (OCC sequence). Note that FIG. 5B illustrates merely one example, and the subcarrier count and the orthogonal sequence count are not limited to these values.

As illustrated in FIG. 5B, the resource identifiers are allocated to the PUCCH resources for the new PUCCH format in sequential order from the time domain. To be specific, the resource identifiers are allocated in sequential order from combinations of the same subcarrier and different orthogonal sequences. In the new PUCCH format, when the resource identifiers are allocated in the sequential order from the frequency domain in the same way as in the existing PUCCH format, such an apprehension exists that all the subcarriers within the usage bandwidth are occupied by the PUCCH. Specifically, the ACKs/NACKs of the plural pieces of user terminal can be code-multiplexed with the same subcarrier owing to the different OCC sequences, but nevertheless there is still an apprehension of decreasing the frequency usage efficiency as a result of being frequency-division-multiplexed with the different subcarriers.

As depicted in FIG. 5B, when allocating the resource identifiers in sequential order from the time domain, the ACKs/NACKs of the plural pieces of user terminal can be multiplexed with the same subcarrier by using the different OCC sequences, and hence frequency usage efficiency can be improved. For example, the resource identifiers "0", "1" and "2" of the PUCCH resources are allocated to user terminal #1, #2 and #3 in sequential order, in which case ACKs/NACKs of the plural pieces of user terminal #1, #2 and #3 can be multiplexed with the same subcarrier #0 by using the different OCC indexes "0", "1" and "2".

In the PUCCH resource of the new PUCCH format, the frequency domain is defined by the subcarrier being orthogonal thereto, and therefore orthogonality between the pieces of user terminal can be maintained even when all the subcarriers within the usage bandwidth are used as the PUCCH resources. In other words, the new PUCCH format, unlike the existing PUCCH format 1a, may not be provided with the unused PUCCH resources (not attached with the resource identifiers) in order to maintain the orthogonality between the user terminals.

Note that the resource identifier attached to each PUCCH resource in FIG. 5B is merely one example, but the embodiment is not limited to this example. For example, when performing the PUCCH transmission over the plural subframes for the coverage enhancement (CE), the same resource identifier may be attached to different PUCCH resources according to a given hopping pattern between the plural subframes. In FIG. 5B, the 3 types of orthogonal sequences are used, but any number of orthogonal sequences and any sequence length thereof may, however, be available.

<Allocation of PUCCH Resource>

The means by which the foregoing PUCCH resource for the new PUCCH format is allocated to the user terminal will be described. The PUCCH resource for the new PUCCH format may be implicitly (1) allocated to the user and may also be explicitly (2) allocated to the user terminal.

(1) Implicit Allocation

The user terminal may determine the PUCCH resource (refer to, e.g., FIG. 5B) on the basis of an index (which will hereinafter be referred to as a CCE index) of a control channel element (CCE Control Channel Element) of the PDCCH (NB-PDCCH) and/or repetition information (e.g., a repetition count, a repetition level, a CE level and other equivalent values) of the PDCCH.

To be specific, the user terminal may derive the resource identifier of the PUCCH resource on the basis of the CCE index and/or the repetition information, and may further derive the tone index value and/or the OCC index value on the basis of the resource identifier. Alternatively, the user terminal may derive the tone index value and/or the OCC index value themselves or itself on the basis of the CCE index and/or the repetition information.

For determining the PUCCH resource, the user terminal may use at least one of a given parameter signaled by the higher-layer signaling, an offset notified by the DCI, and hopping pattern information specifying a hopping pattern between the subframes.

(Explicit Allocation)

Alternatively, the radio base station may transmit the DCI (e.g., DL assignment, UL grant) containing the allocation information of the PUCCH resource. The allocation information may be the resource identifier of the PUCCH resource, or may be the tone index value and/or the OCC index value.

Figure 6A:
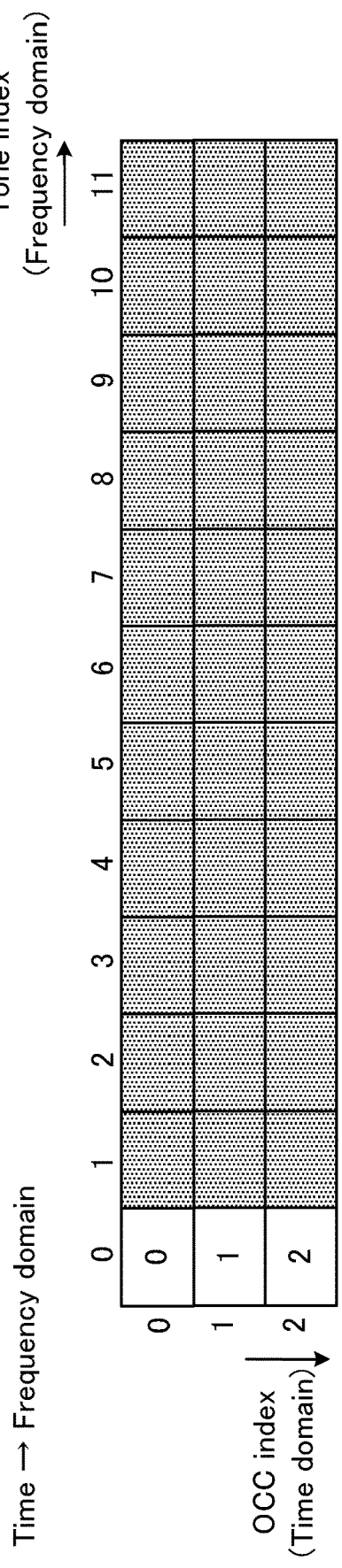
FIGS. 6A and 6B are diagrams illustrating another example of the PUCCH resource according to the first embodiment.
Figure 6B:
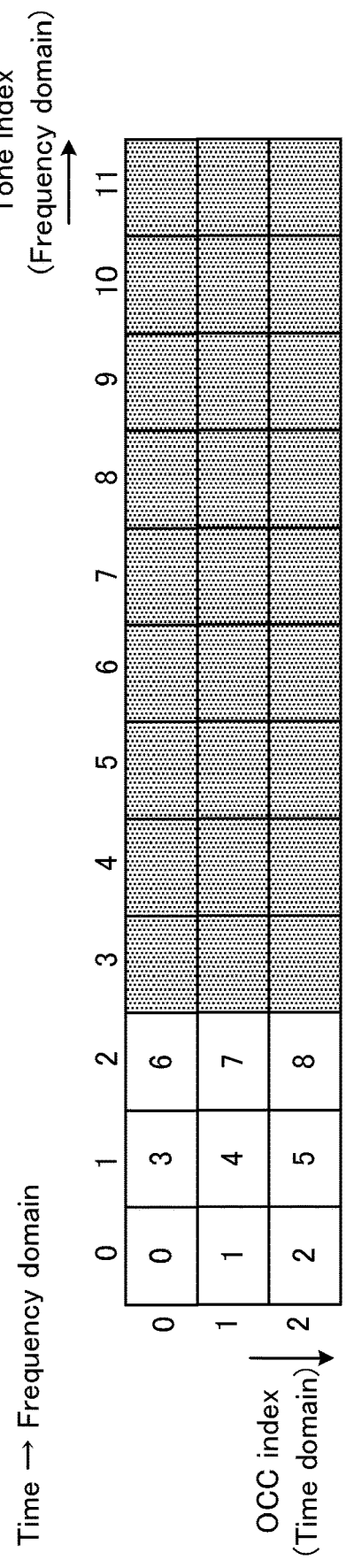

The PUCCH resource is explicitly allocated by using the DCI, in which case the tone count of the tones usable as the PUCCH resources may be restricted. FIG. 6 is a diagram illustrating another example of the PUCCH resource according to the first embodiment. FIGS. 6A and 6B illustrate examples in which the tone count of the tones usable as the PUCCH resources is restricted to "1" and "3". Note that the tone count of the tones usable as the PUCCH resources is not limited to "1" or "3".

It is assumed that the NB-IoT supports {1, 3, 6, 12} as the tone count of the PUCCH of the NB-IoT. Hence, as illustrated in FIGS. 6A and 6B, when the tone count of the tones usable as the PUCCH resources is restricted to "1" or "3", the PUSCH and the PUCCH can be multiplexed more efficiently with the same subcarrier.

As illustrated in FIGS. 6A and 6B, when the subcarrier count of the subcarriers (tones) usable as the PUCCH resources is restricted, the user terminal may be notified of information indicating which subcarrier constitutes the PUCCH resource by the higher-layer signaling (e.g., the RRC signaling or the broadcast information), and may also be notified in a predetermined manner.

For example, it is assumed in FIG. 6A that information indicating that the tone #0 is usable as the PUCCH resource is transmitted to the user terminal by the higher-layer signaling. In FIG. 6A, the user terminal may determine which OCC sequence (i.e., any one of the PUCCH resources #0 to #2) is used in the tone #0, based on the allocation information (e.g., 1 bit or 2 bits) of the PUCCH resource within the DCI.

It is also assumed in FIG. 6B that the information indicating that the tones #0 to #2 are usable as the PUCCH resources is transmitted to the user terminal by the higher-layer signaling. In FIG. 6B, the user terminal may determine which OCC sequence (i.e., any one of the PUCCH resources #0 to #8) is used in any one of the tones #0 to #2, based on the allocation information (e.g., 3 or 4 bits) of the PUCCH resource within the DCI.

The DCI containing the allocation information of the PUCCH resource may be the DL assignment for allocating (assigning) the PDSCH that acknowledges the ACK/NACK, and may also be the DCI for allocating a message 4 in a random access procedure. The message 4 given herein is a contention resolution message sent from the radio base station when the user terminal transmits, to the radio base station, a higher-layer message such as an RRC connection request in response to a random access response (RAR) given from the radio base station 10. The message 4 is transmitted via the PDSCH, and the user terminal receives the DL assignment for allocating the message 4 (PDSCH) via the PDCCH, thus receiving the message 4.

<Modified Example>

The constitution of the new PUCCH format and the PUCCH resource allocation are, though based on assuming the example that the subcarrier interval is 15 kHz, properly applicable to an example wherein the subcarrier interval is 3.75 kHz as well. FIG. 7 is an explanatory diagram of one example of the subcarrier interval according to a modified example of the first embodiment.

When the subcarrier interval is 3.75 kHz, as illustrated in FIG. 7A, the symbol length, the slot length and the subframe length are 4 times larger than those when the subcarrier interval is 15 kHz. The new PUCCH format described in FIG. 4 may therefore be applied to a case of a 4-fold time length.

When the subcarrier interval is 3.75 kHz, a subcarrier count within 1 PRB (180 kHz) is "48" (when the subcarrier interval is 15 kHz, 12 subcarriers are provided per single PRB). Therefore, as illustrated in FIG. 7B, when the subcarrier interval is 3.75 kHz, the PUCCH resource in the frequency domain may be constituted by 48 types of subcarriers (e.g., the tone index values "0" to "47"). Note that FIG. 7B illustrates the example in which the PUCCH in the time domain are constituted by 3 types of orthogonal sequences (e.g., the OCC sequences), and the number of orthogonal sequences is not limited this value "3". The orthogonal spreading in the time domain may not be applied.

The constitution of the new PUCCH format is not limited to the constitution illustrated in FIG. 4 or FIG. 7A. Any number of DMRS symbols and/or information symbols and any positions of these symbols constituting the new PUCCH format may be available. The orthogonal spreading between the information symbols may not be applied. FIG. 8 is a diagram illustrating an example of the constitution of the new PUCCH format according to the modified example of the first embodiment. Note that FIG. 8 illustrates an example wherein the subcarrier interval is 15 kHz, and the embodiment is properly applicable to an example wherein the subcarrier interval is 3.75 kHz as well.

As depicted in FIG. 8A, in the new PUCCH format, the DMRS symbols and the information symbols may be set in the first half and the second half of the subframe. For example, in FIG. 8A, a given number (which is herein "7") of symbols are set as the DMRS symbols in the first half of the subframe, and a given number (which is herein "7") of symbols are set as the information symbols in the second half of the subframe. Thus, the DMRS symbols are arranged in the first half of the subframe, whereby channel estimation accuracy can be improved.

In the example depicted in FIG. 8A, the sequence length of the orthogonal sequence used for block spreading may be equivalent to the information symbol count (which is herein "7") within the subframe. The DMRS symbol count and the information symbol count within the subframe are set equal in FIG. 8A, but may not be set equal.

Alternatively, as illustrated in FIG. 8B, the new PUCCH format may also be constituted to include the information symbols without including the DMRS symbols. Further alternatively, a known sequence (e.g., PN (Pseudo-random Noise) sequence) may be transmitted between the radio base station and the user terminal in response to both of the ACK and the NACK. A receiver (which is herein the radio base station) can detect (demodulate) the information symbols by a maximum likelihood (ML: Maximum Likelihood) method without conducting the channel estimation using the DMRS. The NACK is not distinguishable from the DTX, in which case the sequence (PN sequence) may be transmitted only for the case of ACK but may not be transmitted for the case of NACK. It is desirable that the known sequence be cell-specific or user-specific in order to relieve a degree inter-cell interference. The known sequence may be broadcast, may be signaled by the RRC signal, and may be obtained by being associated with a user terminal identifier (UE-ID) and a cell identifier (Cell ID).

In the example illustrated in FIG. 8B, the radio base station detects a modulation symbol (ACK/NACK bit) of the ACK/NACK by the ML method. In this instance, detection accuracy can be improved as compared with an example of detecting the modulation symbol of the ACK/NACK by channel estimation using the DMRS.

In the example illustrated in FIG. 8B, the overhead of the DMRS can be reduced, and hence this new PUCCH format is suited for single-tone transmission (i.e., an instance of the frequency resources being small). As illustrated in FIG. 8B, the constitution of not arranging the DMRS symbols is suitable when using the reduced TTI shorter than the normal TTI (subframe, 1ms) (i.e., when the time resources are small) as well.

Alternatively, as depicted in FIG. 8C, in the new PUCCH format, the cyclic prefix (CP) is not attached to each symbol, but may be attached only when the DMRS symbol and the information symbol are switched over. When block spreading is not applied (when not multiplying the orthogonal sequence) in the new PUCCH format, the same symbol is repeated, and hence, as illustrated in FIG. 8C, the cyclic prefixes (CPs) attached to the respective symbols may be aggregated. In the example illustrated in FIG. 8C, a CP length can be set longer than when the CP is attached to each symbol, and it is therefore feasible to improve durability (to attain robustness) against coverage enhancement.

Note that the new PUCCH formats depicted in FIGS. 4, 7A and 8A to 8C are applicable irrespective of whether or not frequency hopping is applied between the slots or between the subframes.

As discussed above, the first embodiment enables the transmission of the retransmission control information by using the new PUCCH format suited to single-tone transmission, and therefore enables the radio base station to improve the detection accuracy of the retransmission control information. The retransmission count can be thereby decreased, and hence this decrease is effective in reducing power consumption of the user terminal.

Second Embodiment

According to a second embodiment, the retransmission control information is recognized from whether tone transmission is performed or not. To be specific, the user terminal, only when succeeding in decoding the downlink signal, transmits the retransmission control information (ACK) by using the transmission resource constituted by the single subcarrier.

When the radio base station may not change a redundancy version upon retransmitting the downlink signal, the DTX and the NACK may not be distinguished from each other. This is because the radio base station may simply transmit the same downlink signal (downlink data, PDSCH) when receiving the DTX or the NACK from the user terminal. Herein, the DTX represents a result of a determination that neither the ACK nor the NACK has been signaled from the user terminal, and may denote that the user terminal has been prevented from receiving the PDCCH.

As described above, when the DTX and the NACK may not be distinguished from each other, it may be sufficient that the radio base station detects a binary of the ACK and the DTX or the NACK (which will hereinafter be notated by DTX/NACK) (i.e., detects whether the value indicates the ACK or not). The radio base station may therefore detect whether user terminal transmits the ACK or not, based on the transmission or non-transmission of the transmission resource (e.g., the tone in a given position).

FIG. 9 is a diagram illustrating one example of a retransmission control information transmission method according to the second embodiment. Note that FIG. 9 illustrates an example wherein the subcarrier interval is 15 kHz (i.e., 12 subcarriers per single PRB), but the subcarrier interval is not limited to this value. For example, the retransmission control information transmission method is properly applicable also when the subcarrier interval is 3.75 kHz.

Figure 9A:
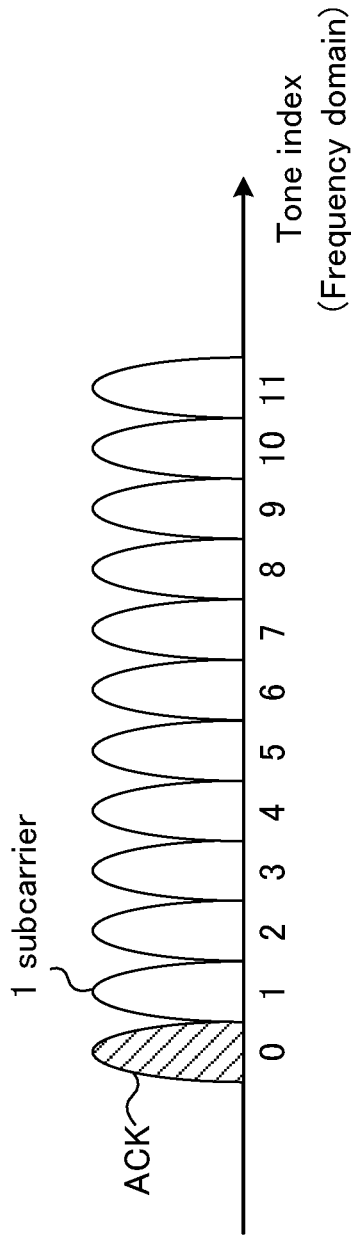
FIGS. 9A and 9B are diagrams each illustrating one example of a transmission method of retransmission control information according to a second embodiment.
Figure 9B:
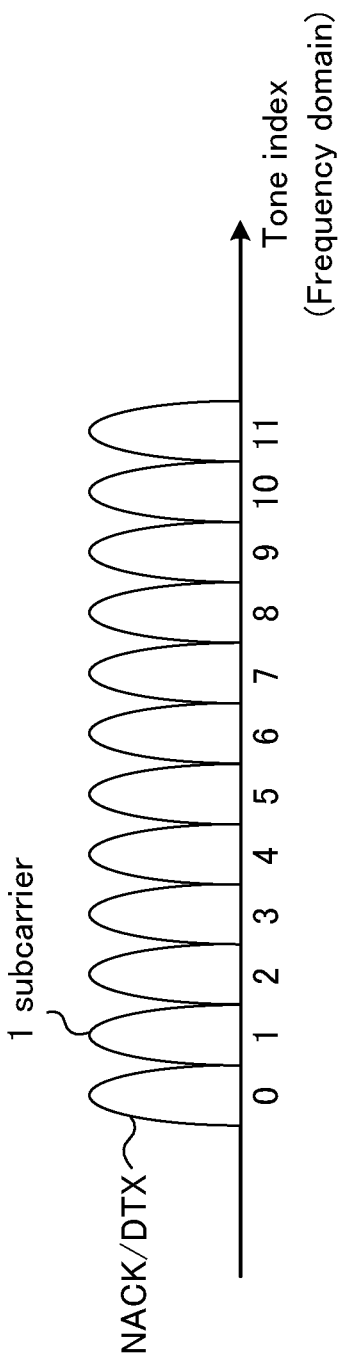

It is assumed in FIGS. 9A and 9B that the tone #0 is allocated as the transmission resource. The user terminal, as illustrated in FIG. 9A, transmits the ACK at the subcarrier (tone) #0 when succeeding in decoding the downlink data. Whereas when prevented from receiving the PDCCH (when normally transmitting the DTX) or when failing in decoding the downlink signal (when normally transmitting the NACK), as illustrated in FIG. 9B, the user terminal does not perform the transmission (stops the transmission) by the subcarrier #0.

The radio base station, when detecting the transmission by the subcarrier #0 at given timing (e.g., a subframe after a predetermined period from the transmission subframe of the PDSCH), makes an ACK determination to not retransmitting the downlink data. Whereas when not detecting the transmission by the subcarrier #0 at the given timing, the radio base station makes a DTX or NACK determination of retransmitting the downlink signal.

Note that the ACKs of the plural pieces of user terminal may be multiplexed with the same subcarrier #0 in FIG. 9. For example, the different orthogonal sequences are allocated to the plural pieces of user terminal receiving the allocation of the same subcarrier #0, and the plural pieces of user terminal may be code-division-multiplexed. In this case, the ACK transmission resource is specified by a combination of the subcarrier and the orthogonal sequence.

<Allocation of Transmission Resource>

Allocation of the ACK transmission resource will be described. As described in FIGS. 5B and 6, a resource identifier may be attached to the ACK transmission resource. The ACK transmission resource may be implicitly allocated to the user terminal (1), and may also be explicitly allocated to the user terminal (2).

(1) Implicit Allocation

The user terminal may determine the ACK transmission resource, based on the CCE index of the PDCCH (NB-PDCCH) and/or the repetition information of the PDCCH. To be specific, the user terminal may derive the resource identifier of the transmission resource on the basis of the CCE index and/or the repetition information, and may further derive the tone index value and/or the OCC index value on the basis of the resource identifier. Alternatively, the user terminal may also derive the tone index value and/or the OCC index value themselves or itself on the basis of the OCC index value and/or the repetition information.

The user terminal may use at least one of a given parameter signaled by the higher-layer signaling, an offset signaled by the DCI and hopping pattern information indicating a hopping pattern between the subframes for determining the transmission resource.

(2) Explicit Allocation

Alternatively, the radio base station may transmit the DCI (e.g., DL assignment, UL grant) containing the allocation information of the transmission resource. The allocation information may be the resource identifier of the transmission resource, and may also be the tone index value and/or the OCC index value. The DCI containing the allocation information of the transmission resource may be the DL assignment for allocating the PDSCH that acknowledges the ACK/NACK, and may also be the DCI for allocating the message 4 in the random access procedure.

As discussed above, the second embodiment enables the radio base station to detect whether the retransmission is to be performed or not, depending on whether there is single-tone transmission in the given transmission resource or not. The radio base station is thereby able to improve the detection accuracy of the retransmission control information. The transmission method according to the second embodiment is applicable to the 5G radio access method and the IoT when using the reduced TTI shorter than the normal TTI (subframe, 1ms).

(Radio Communication System)

An architecture of the radio communication system according to one embodiment of the present invention will hereinafter be described. The radio communication method according to each embodiment described above is applied to this radio communication system. Note that the radio communication methods according to the respective embodiments may be solely used and may also be used in combination. The NB-IoT user terminal is herein exemplified as user terminal with usage bandwidth being restricted to the narrow band, but the embodiment is not limited to this exemplification.

Figure 10:
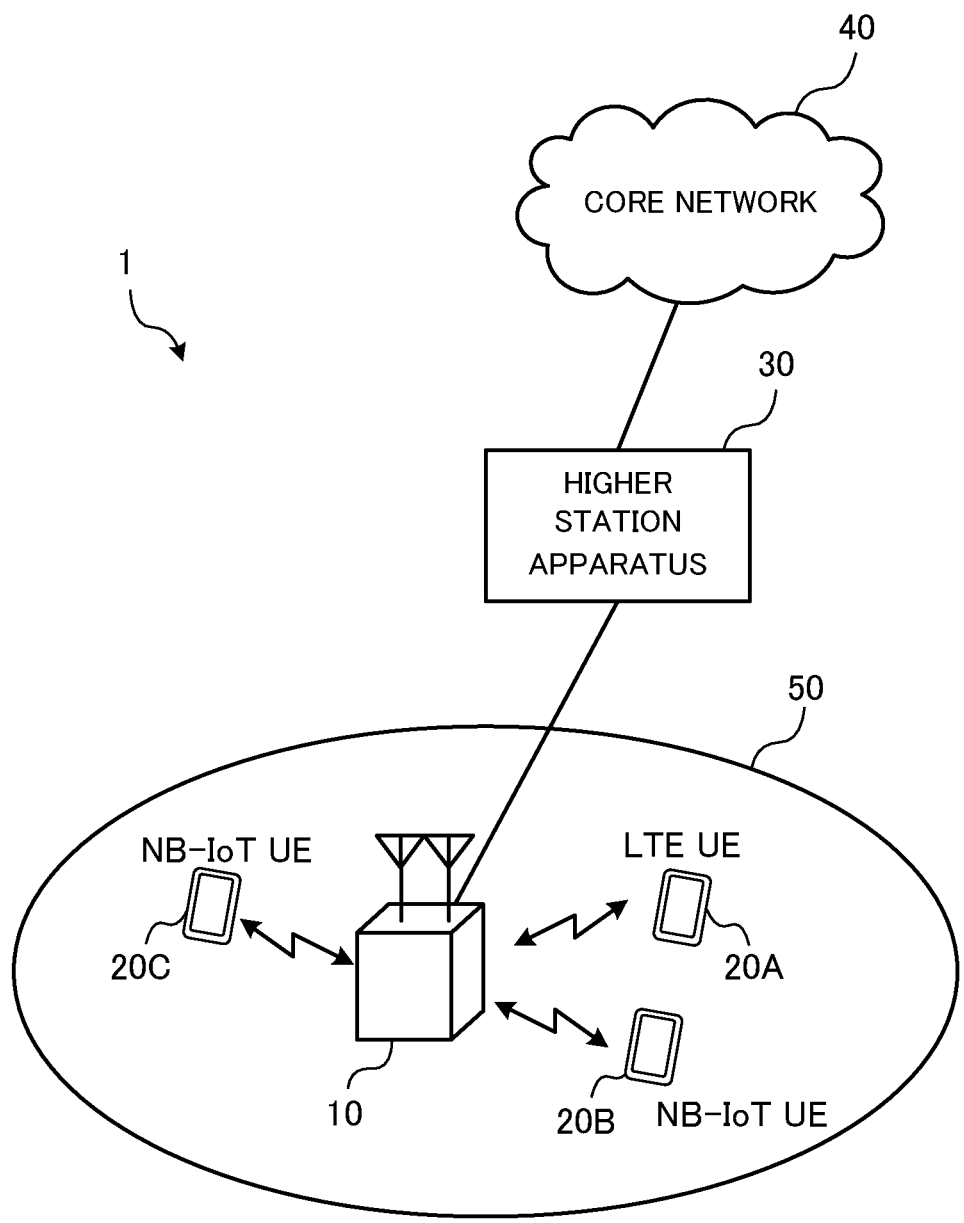
FIG. 10 is a schematic diagram of architecture of a radio communication system according to an embodiment.

FIG. 10 is a view schematically illustrating the radio communication system according to one embodiment of the present invention. A radio communication system 1 illustrated in FIG. 10 is one example of adopting an LTE system in a network domain of a machine communication system. A carrier aggregation (CA) constituted by aggregating a plurality of fundamental frequency blocks (component carriers) with one unitary parameter being a system bandwidth of the LTE system and/or dual connectivity (DC) can be applied to a radio communication system 1. The LTE system is constituted such that both of the downlink and the uplink are set to the system bandwidths ranging from 1.4 MHz at the minimum up to 20 MHz at the maximum, but the embodiment is not limited to this constitution.

Note that the radio communication system 1 may also be called such as SUPER 3G, IMT-Advanced, 4G (4th generation mobile communication system), 5G (5th generation mobile communication system), FRA (Future Radio Access), and IoT.

The radio communication system 1 is constituted to include a radio base station 10, and a plurality of pieces of user terminal 20A, 20B and 20C wirelessly connected to the radio base station 10. The radio base station 10 is connected to a higher station apparatus 30 and further connected to a core network 40 via the higher station apparatus 30. Note that the higher station apparatus 30 includes, e.g., an access gateway apparatus, a radio network controller (RNC) and a mobility management entity (MME), but the embodiment is not limited to these apparatuses.

The plural pieces of user terminal 20 (20A to 20C) are capable of performing communications with the radio base station 10 in a cell 50. For example, the user terminal 20A is a user terminal (which will hereinafter be referred to as an LTE terminal (LTE UE: LTE User Equipment)) that supports LTE (up to Rel-10) or LTE-Advanced (from Rel-10 onward), and the other user terminals 20B, 20C are NB-IoT (NB-IoT UE (NB-IoT User Equipment)) each a communication device in the machine communication system. The user terminals 20A, 20B and 20C will hereinafter be generically referred to as the user terminal 20 unless otherwise distinguished. The user terminal 20 may be abbreviated to UE (User Equipment).

The NB-IoT user terminal 20B, 20C are user terminal with usage bandwidth restricted to the narrow band narrower than the minimum system bandwidth supported by the existing LTE system. Note that the NB-IoT user terminals 20B, 20C may be terminals that support a variety of communication systems such as LTE and LTE-A, and may also be mobile communication terminals such as vehicles without being limited to fixed communication terminals such as an electric meter, a gas meter and a vending machine. The user terminal 20 may perform communications directly with other user terminal 20, and may also perform the communications via the radio base station 10 with other user terminal 20.

In the radio communication system. 1, OFDMA (Orthogonal Frequency Division Multiple Access) is applied as a radio access method to the downlink, while SC-FDMA (Single Carrier FDMA) is applied as another radio access method to the uplink. The OFDMA is defined as a multi carrier transmission method of performing the communications by dividing the frequency band into narrow frequency bands (subcarriers) and mapping the data to the subcarriers. The SC-FDMA is defined as a single carrier transmission method wherein a system bandwidth is divided into plural bands formed by single or consecutive resource blocks on a per-terminal basis, and the plural terminals use the bands different from each other, thereby reducing interference between the terminals. Note that the uplink and downlink radio access methods are not limited to the combination thereof.

The radio communication system 1 involves using downlink channels such as a PDSCH (Physical Downlink Shared Channel), a PBCH (Physical Broadcast Channel) and a downlink L1/L2 control channel, which are shared among the user terminal 20. The user data, the higher-layer control information and a given SIB (System Information Block) are transmitted via the PDSCH. An MIB (Master Information Block) is transmitted via the PBCH.

The downlink L1/L2 control channel includes downlink control channels such as a PDCCH (Physical Downlink Control Channel), an EPDCCH (Enhanced Physical Downlink Control Channel), a PCFICH (Physical Control Format Indicator Channel), and a PHICH (Physical Hybrid-ARQ Indicator Channel). The Downlink Control Information (DCI) containing the scheduling information of the PDSCH and the PUSCH is transmitted via the PDCCH. An OFDM symbol count used for the PDCCH is transmitted via the PCFICH. Retransmission control information (HARQ-ACK) for the PUSCH is transmitted via the PHICH. The EPDCCH is frequency-division-multiplexed with the PDSCH and is used for transmitting the DCI in the same way as the PDCCH.

The radio communication system 1 further involves using the uplink channels such as a physical uplink shared channel (PUSCH: Physical Uplink Shared Channel), a physical uplink L1/L2 control channel (PUCCH: Physical Uplink Control Channel), and a physical random access channel (PRACH: Physical Random Access Channel), which are shared among the user terminal 20. The PUSCH may also be called an uplink data channel. The user data and the higher-layer control information are transmitted via the PUSCH. Downlink radio quality information (CQI (Channel Quality Indicator)) and the retransmission control information (HARQ-ACK) are transmitted via the PUCCH. A random access preamble for establishing a connection with the cell is transmitted via the PRACH.

Note that the channels oriented to the MTC terminal/NB-IoT user terminal may be expressed by being marked with "M" representing the MTC and "NB" representing the NB-IoT, and the PDCCH/EPDCCH, the PDSCH, the PUCCH and the PUSCH oriented for the MTC terminal and the NB-IoT user terminal may also be called M(NB)-PDCCH, M(NB)-PDSCH, M(NB)-PUCCH and M(NB)-PUSCH, respectively. These channels will hereinafter be simply called the PDCCH, the PDSCH, the PUCCH and the PUSCH unless otherwise distinguished.

The radio communication system 1 transmits a cell-specific reference signal (CRS: Cell-specific Reference Signal), a channel state information-reference signal (CSI-RS: Channel State Information-Reference Signal), a demodulation reference signal (DMRS: DeModulation Reference Signal) and a positioning reference signal (PRS: Positioning Reference Signal) as downlink reference signals. The radio communication system 1 also transmits a Sounding Reference Signal (SRS) and the Demodulation Reference Signal (DMRS) as uplink reference signals. Note that the DMRS may also be called a user terminal specific reference signal (UE-specific Reference Signal). The reference signals to be transmitted are not limited to these signals.

<Radio Base Station>

Figure 11:
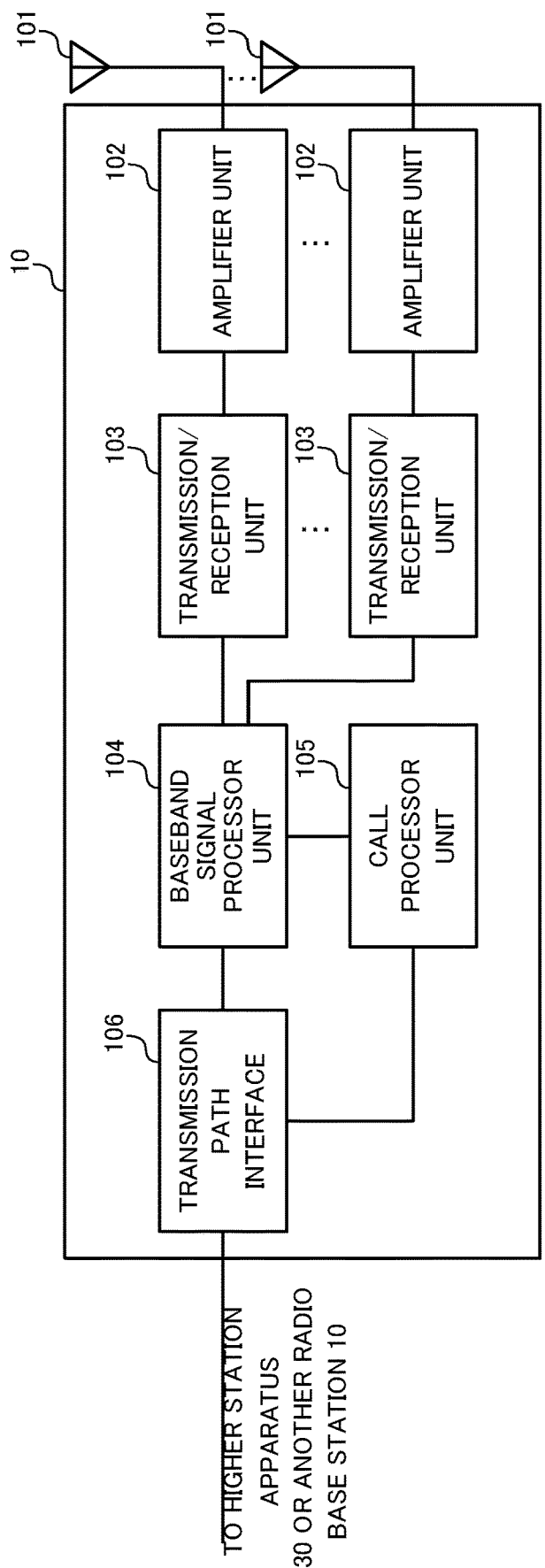
FIG. 11 is a diagram illustrating one example of a whole constitution of a radio base station according to the embodiment.

FIG. 11 is a diagram illustrating one example of an overall constitution of a radio base station according to one embodiment of the present invention. A radio base station 10 includes at least a plurality of transmission/reception antennas 101, an amplifier unit 102, a transmission/reception unit (transmission/reception section) 103, a baseband signal processor unit 104, a call processor unit 105, and a transmission path interface 106.

The user data transmitted to the user terminal 20 from the radio base station 10 via the downlink is inputted to the baseband signal processor unit 104 from the higher station apparatus 30 via the transmission path interface 106.

The baseband signal processor unit 104 is constituted such that the user data is transferred to the transmission/reception unit 103 after undergoing transmission processes such as a PDCP (Packet Data Convergence Protocol) layer process, a user data segmenting/coupling process, an RLC (Radio Link Control) layer transmission process such as RLC retransmission control, MAC (Medium Access Control) retransmission control (e.g., an HARQ (Hybrid Automatic Repeat reQuest) transmission process), scheduling, transmission format selection, channel coding, an IFFT (Inverse Fast Fourier Transform) process, and a pre-coding process. The downlink control signal is also transferred to each transmission/reception unit 103 after undergoing transmission processes such as the channel coding and the IFFT.

Each transmission/reception unit 103 transmits a baseband signal pre-coded and outputted per antenna from the baseband signal processor unit 104 by converting this baseband signal into a radio frequency band. The transmission/reception unit 103 may be constituted by a transmitter/receiver, a transmission/reception circuit or a transmission/reception device, which are described based on the common recognition in the technical field according to the present invention. Note that the transmission/reception unit 103 may be constituted as an integral transmission/reception unit, and may also be constituted to include the transmission unit and the reception unit.

A radio frequency signal, which is frequency-converted by the transmission/reception unit 103, is amplified by the amplifier unit 102 and transmitted from the transmission/reception antenna 101. The transmission/reception unit 103 can transmit and receive a variety of signals at a narrow bandwidth (e.g., 180 kHz) restricted narrower than a system bandwidth (e.g., one component carrier).

The radio frequency signal, received by the transmission/reception antenna 101, of the uplink signal is each amplified by the amplifier unit 102. The transmission/reception unit 103 receives the uplink signal amplified by the amplifier unit 102. The transmission/reception unit 103 performs the frequency conversion of the reception signal into the baseband signal, and outputs the baseband signal to the baseband signal processor unit 104.

The baseband signal processor unit 104 is constituted such that the user data contained in the inputted uplink signal is transferred to the higher station apparatus 30 via the transmission path interface 106 after undergoing an FFT (Fast Fourier Transform) process, an IDFT (Inverse Discrete Fourier Transform) process, error correction decoding, a MAC retransmission control reception process, and an RCL/PDCP layer reception process. The call processor unit 105 executes a call process such as setting and releasing the communication channel, and manages a status of the radio base station 10 and the radio resources.

The transmission path interface 106 transmits and receives the signal to and from the higher station apparatus 30 via a certain interface. The transmission path interface 106 may also transmit and receive (backhaul signaling) the signal to and from another radio base station 10 via an inter base station interface (e.g., the optical fiber and the X2 interface conforming to CPRI (Common Public Radio Interface)).

The transmission/reception unit 103 transmits, to the user terminal 20, the downlink signals such as a synchronization signal, a reference signal, a control signal and a data signal in the narrow band. The transmission/reception unit 103 receives the uplink signals such as the reference signal, the control signal and the data signal in the narrow band. Specifically, the transmission/reception unit 103 transmits a downlink control signal (DCI), and higher-layer control information based on the higher-layer signaling. The transmission/reception unit 103 transmits the PDSCH allocated to the user terminal 20, and receives the PUSCH allocated to the user terminal 20 by the DCI.

Figure 12:
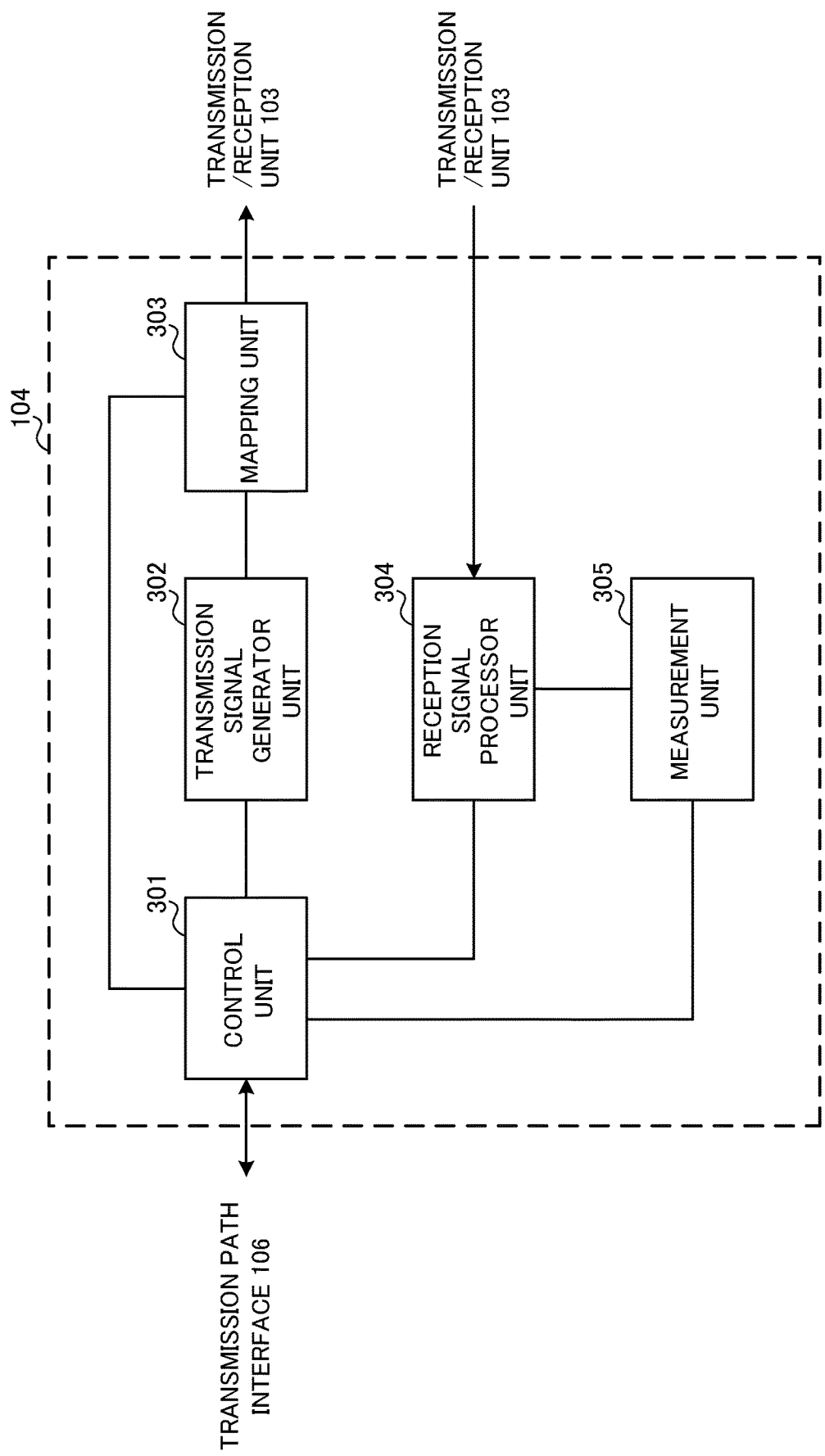
FIG. 12 is a diagram illustrating one example of a constitution of functions of the radio base station according to the embodiment.

FIG. 12 is a diagram illustrating one example of a constitution of functions of the radio base station according to one embodiment of the present invention. Note that FIG. 12 mainly illustrates function blocks of characteristic components in the embodiment, and the radio base station 10 can include other function blocks suitable for the radio communications. As depicted in FIG. 12, a baseband signal processor unit 104 includes at least a control unit (control section) 301, a transmission signal generator unit (generation unit) 302, a mapping unit 303, a reception signal processor unit 304, and a measurement unit 305.

The control unit 301 controls the entire radio base station 10. The control unit 301 may be constituted by a controller, a control circuit or a control device, which are described based on the common recognition in the technical field according to the present invention.

The control unit 301 controls, e.g., signal generation of a transmission signal generator unit 302 and signal allocation of the mapping unit 303. The control unit 301 further controls a signal reception process of the reception signal processor unit 304 and signal sounding of the measurement unit 305.

The control unit 301 controls resource allocation (scheduling) of system information, the PDSCH and the PUSCH. The control unit 301 also controls the resource allocation of downlink reference signals such as synchronization signals (e.g., PSS (Primary Synchronization Signal)/SSS (Secondary Synchronization Signal), NB-SS), the CRS, the CSI-RS and the DM-RS.

The control unit 301 commands the transmission signal generator unit 302 and the mapping unit 303 to transmit the variety of signals to the user terminal 20 by being allocated to the narrow band. The control unit 301 commands to transmit the downlink broadcast information (MIB, SIB (MTC-SIB)) and PDCCH (M-PDCCH, NB-PDCCH) and the PDSCH in the narrow band. The narrow band (NB) is a band (e.g., 180 kHz) narrower than the system bandwidth of the existing LTE system.

The control unit 301 may also command the transmission signal generator unit 302, the mapping unit 303 and the transmission/reception unit 103 to generate the downlink control signal (DCI) containing the transmission resource allocation information (e.g., the resource identifier) when explicitly allocating the transmission resources (the PUCCH resource of the new PUCCH format in the first embodiment, and the transmission resource in the second embodiment) of the retransmission control information. When implicitly allocating the transmission resource, the control unit 301 may also command the transmission signal generator unit 302, the mapping unit 303 and the transmission/reception unit 103 to transmit the information (e.g., the parameter based on the higher-layer signaling, the offset within the DCI) used for determining the transmission resource on the user terminal 20.

The control unit 301 controls the retransmission of the downlink signal, based on the retransmission control information given from the user terminal 20. To be concrete, the control unit 301 may also command the transmission signal generator unit 302, the mapping unit 303 and the transmission/reception unit 103 to retransmit the downlink signal when the retransmission control information given from the user terminal 20 indicates the DTX/NACK (the first embodiment).

Alternatively, the control unit 301 makes the ACK determination of not retransmitting the downlink signal when detecting the transmission by the given transmission resource at the given timing ((e.g., the subframe after the predetermined period from the transmission subframe of the PDSCH). Whereas when not detecting the transmission by the given transmission resource at the given timing, the radio base station may make the DTX or NACK determination of retransmitting the downlink signal (the second embodiment).

The control unit 301 receives the PUSCH by the determined PUSCH resource in cooperation with the transmission/reception unit 103, the transmission signal generator unit 302 and the measurement unit 305. The control unit 301 transmits the PDSCH by the determined PDSCH resource in cooperation with transmission signal generator unit 302, the mapping unit 303 and the transmission/reception unit 103.

The transmission signal generator unit (generation unit) 302 generates, based on an instruction given from the control unit 301, the downlink signals (the PDCCH, the PDSCH and the downlink reference signal), and outputs the generated downlink signals to the mapping unit 303. The transmission signal generator unit 302 can be constituted as a signal generator, a signal generation circuit or a signal generation device, which are described based on the common recognition in the technical field according to the present invention.

The transmission signal generator unit 302 generates, based on, e.g., the instruction given from the control unit 301, the DCI (which is also termed the DL assignment, the UL grant) for allocating the PUSCH and/or the PDSCH to the user terminal 20. The PDSCH undergoes a coding process and a modulation process in accordance with the coding rate and a modulation method, which are determined based on channel state information (CSI) and other equivalent information given from the individual user terminal 20.

The mapping unit 303 maps, based on the instruction given from the control unit 301, the downlink signal generated by the transmission signal generator unit 302 to a given radio source (e.g., 1 resource block at the maximum) of the narrow band, and outputs the mapped downlink signal to the transmission/reception unit 103. The mapping unit 303 can be constituted as a mapper, a mapping circuit or a mapping device, which are described based on the common recognition in the technical field according to the present invention.

The reception signal processor unit 304 executes the reception process (such as de-mapping, demodulation and decoding) for the reception signal inputted from the transmission/reception unit 103. The reception signal is exemplified by the uplink signal (the PUCCH, the PUSCH, the uplink reference signal) transmitted from the user terminal 20. The reception signal processor unit 304 can be constituted as a signal processor, a signal processor circuit or a signal processor device, which are described based on the common recognition in the technical field according to the present invention.

The reception signal processor unit 304 outputs information decoded by the reception process to the control unit 301. The reception signal processor unit 304 outputs the reception signal and a post-reception-processing signal to the measurement unit 305.

The measurement unit 305 performs measurement with respect to the received signal. The measurement unit 305 can be constituted as a measurement instrument, a measurement circuit or a measurement device, which are described based on the common recognition in the technical field according to the present invention.

The measurement unit 305 may also estimate reception power (e.g., RSRP (Reference Signal Received Power)), reception quality (e.g., RSRQ (Reference Signal Received Quality)) and a channel state of the received signal. An estimation result may be outputted to the control unit 301.

<User Terminal>

Figure 13:
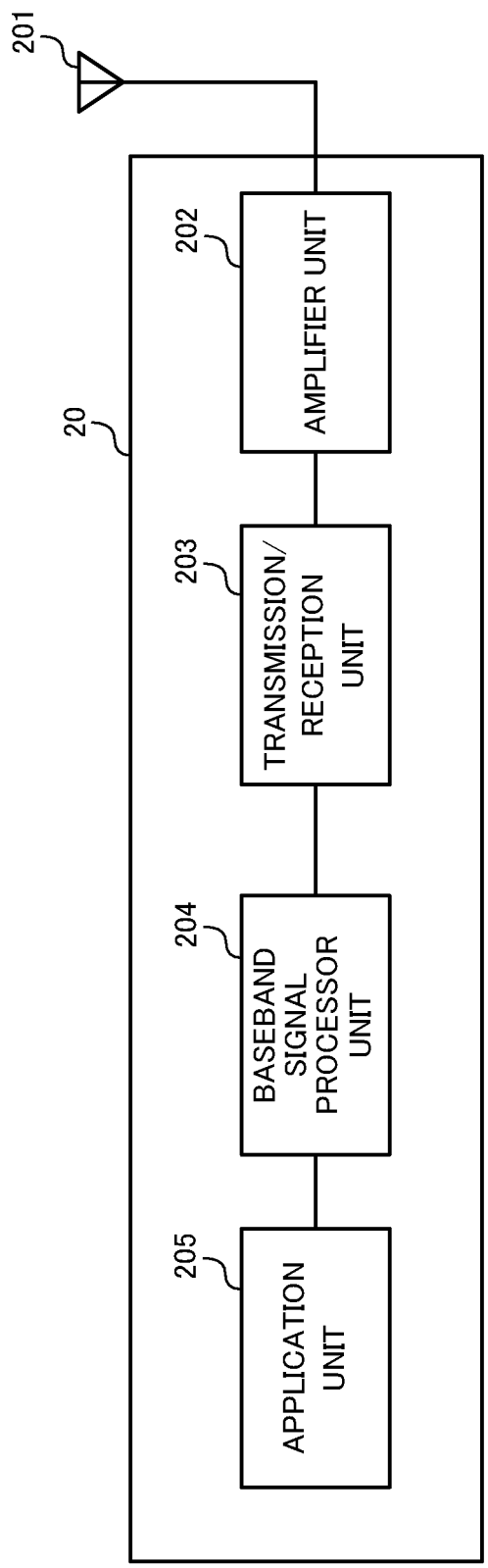
FIG. 13 is a diagram illustrating one example of a whole constitution of user terminal according to the embodiment.

FIG. 13 is a diagram illustrating one example of an overall constitution of the user terminal according to one embodiment of the present invention. Note that the normal LTE terminal may operate to function as the NB-IoT user terminal, though a detailed description thereof is omitted herein. The user terminal 20 includes at least a transmission/reception antenna 201, an amplifier unit 202, a transmission/reception unit (transmission/reception section) 203, a baseband signal processor unit 204, and an application unit 205. The user terminal 20 may include the plurality of transmission/reception antennas 201, the plurality of amplifier units 202, and the plurality of transmission/reception units 203.

The radio frequency signal received by the transmission/reception antenna 201 is amplified by the amplifier unit 202. The transmission/reception unit 203 receives the downlink signal amplified by the amplifier unit 202.

The transmission/reception unit 203 performs frequency conversion of the reception signal into the baseband signal, and outputs the baseband signal to the baseband signal processor unit 204. The transmission/reception unit 203 can be constituted as a transmitter/receiver, a transmission/reception circuit or a transmission/reception device, which are described based on the common recognition in the technical field according to the present invention. Note that the transmission/reception unit 203 may be constituted as an integral transmission/reception unit, and may also be constituted to include the transmission unit and the reception unit.

The baseband signal processor unit 204 executes the FFT process, the error correction decoding and the retransmission control reception process with respect to the inputted baseband signal. The downlink user data is transferred to the application unit 205. The application unit 205 executes processes regarding higher layers than a physical layer and the MAC layer. Of the downlink data, the broadcast information is also transferred to the application unit 205.

The uplink user data is inputted to the baseband signal processor unit 204 from the application unit 205. The baseband signal is transferred to the transmission/reception unit 203 after undergoing a transmission process of retransmission control information (HARQ-ACK), channel coding, pre-coding, a discrete Fourier transform (DFT: Discrete Fourier Transform) process, the IFFT process in the baseband signal processor unit 204.

The transmission/reception unit 203 converts the baseband signal outputted from the baseband signal processor unit 204 into the radio frequency band, and thus transmits the radio frequency signal. The radio frequency signal being frequency-converted by the transmission/reception unit 203 is amplified by the amplifier unit 202 and transmitted from the transmission/reception antenna 201.

The transmission/reception unit 203 receives the downlink signals such as the synchronization signal, the reference signal, the control signal and the data signal in the narrow band from the radio base station 10. The transmission/reception unit 203 transmits the uplink signals such as the reference signal, the control signal and the data signal in the narrow band to the radio base station 10. Specifically, the transmission/reception unit 203 receives the downlink control signal (DCI) and the higher-layer control information based on the higher-layer signaling. The transmission/reception unit 203 receives the PDSCH allocated to the user terminal 20 by the DCI, and transmits the PUSCH allocated to the user terminal 20 by the DCI.

Figure 14:
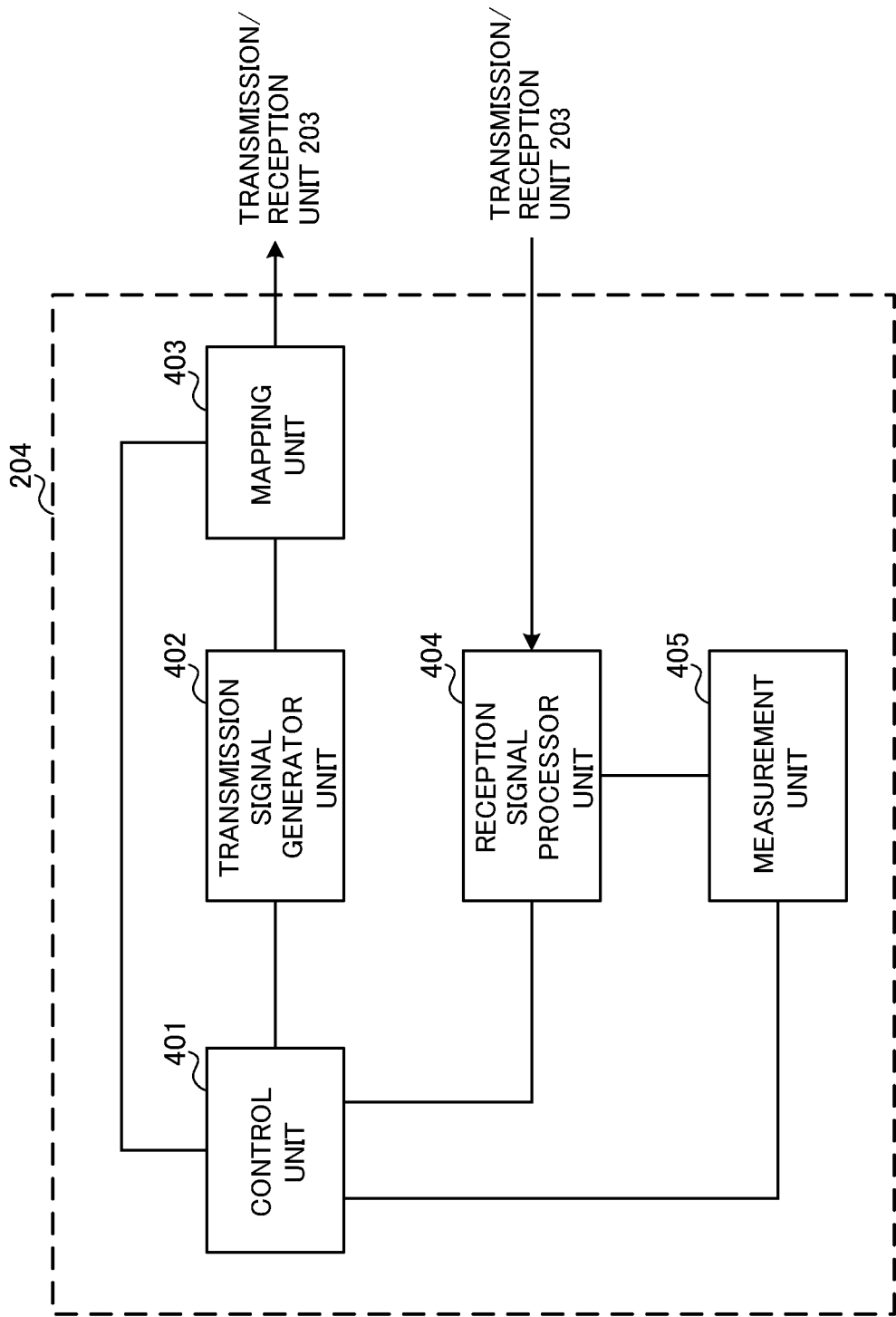
FIG. 14 is a diagram illustrating one example of a constitution of functions of the user terminal according to the embodiment.

FIG. 14 is a diagram illustrating one example of a constitution of functions of the user terminal according to one embodiment of the present invention. Note that FIG. 14 mainly illustrates function blocks of characteristic components in the embodiment, and the user terminal 20 may include other function blocks suitable for the radio communications. As depicted in FIG. 14, a baseband signal processor unit 204 possessed by the user terminal 20 includes at least a control unit (control section) 401, a transmission signal generator unit (generation section) 402, a mapping unit 403, a reception signal processor unit 404, and a measurement unit 405.

The control unit 401 controls all of user terminal 20. The control unit 401 can be constituted as a controller, a control circuit or a control device, which are described based on the common recognition in the technical field according to the present invention.

The control unit 401 controls, e.g., signal generation of the transmission signal generator unit 402 and signal allocation of the mapping unit 403. The control unit 401 further controls a signal reception process of the reception signal processor unit 404 and signal measurement of the measurement unit 405.

The control unit 401 acquires, from the reception signal processor unit 404, the downlink signals (the PDCCH, the PDSCH, the downlink reference signal) transmitted from the radio base station 10. The control unit 401 controls, based on the downlink signal, the generation of the uplink control information (UCI) such as the retransmission control information (HARQ-ACK, ACK/NACK, ACK) and the channel state information (CSI), and the uplink data.

The control unit 401 controls the transmission of the retransmission control information of the downlink signal (e.g., the PDSCH). To be specific, the control unit 401 determines the transmission resource (the PUCCH resource of the new PUCCH format in the first mode, the transmission resource in the second mode) constituted by the single subcarrier. The control unit 401 controls the transmission signal generator unit 402 and the transmission/reception unit 203 to transmit the retransmission control information by use of the transmission resource.

The transmission resource may be, herein, constituted by the single subcarrier, and may also be constituted by a combination of the single subcarrier and the orthogonal sequence used for the orthogonal spreading of the retransmission control information (FIGS. 5 and 6). The resource identifiers for identifying the transmission resources may be attached in sequential order from the combinations of the same subcarrier and different orthogonal sequences.

The control unit 401 may determine the transmission resource on the basis of at least one of the control channel element (CCE) index constituting the downlink control signal (e.g., the PDCCH), and the repetition information of the downlink control signal (the example of the implicit allocation). Alternatively, the control unit 401 may determine the transmission resource on the basis of the allocation information when the reception unit 203 receives the downlink control signal containing the allocation information of the transmission resource (the example of the explicit allocation).

The control unit 401 controls the transmission signal generator unit 402 to generate the retransmission control information on the basis of a result of decoding the downlink signal in the reception signal processor unit 404. To be specific, the control unit 401 may generate the retransmission control information indicating the ACK/NACK of the downlink signal (the first mode). Alternatively, the control unit 401 may also command the transmission signal generator unit 402 to generate the retransmission control information indicating the ACK only when succeeding in decoding the downlink signal (the second mode).

The control unit 401 may command the transmission signal generator unit 402 and the mapping unit 403 to decode/modulate and map the retransmission control information, based on the new PUCCH format (the first mode). Specifically, the control unit 401 may also command the mapping unit 403 to map the demodulation reference signal of the retransmission control information to at least one of the symbols constituting the new PUCCH format. The control unit 401 may further command the mapping unit 403 to map the retransmission control information to all the symbols constituting the new PUCCH format.

The control unit 401 may command the transmission signal generator unit 402 and the transmission/reception unit 203 to transmit the retransmission control information indicating the ACK only when succeeding in decoding the downlink signal (the second mode).

The control unit 401 transmits the PUSCH by the PUSCH resource in cooperation with the transmission signal generator unit 402, the mapping unit 403 and the transmission/reception unit 203. The control unit 401 receives the PDSCH by the PDSCH resource in cooperation with the transmission/reception unit 203, the reception signal processor unit 404 and the measurement unit 405.

The transmission signal generator unit 402 generates, based on the instruction given from the control unit 401, the uplink signals (the PUCCH, the PUSCH, the uplink reference signal), and outputs the generated uplink signals to the mapping unit 403. The transmission signal generator unit 402 can be constituted as a signal generator, a signal generation circuit or a signal generation device, which are described based on the common recognition in the technical field according to the present invention.

The transmission signal generator unit 402 generates, based on, e.g., the instruction given from the control unit 401, the uplink control information (UCI) and/or the uplink data. The transmission signal generator unit 402 also generates the PUSCH for transmitting the UCI and/or the uplink data, based on the instruction given from the control unit 401. For example, the transmission signal generator unit 402 is instructed by the control unit 401 to generate the PUSCH when receiving the DCI for allocating the PUSCH to the user terminal 20. The transmission signal generator unit 402 generates the PUCCH for transmitting the UCI, based on the instruction given from the control unit 401.

The mapping unit 403 maps, based on the instruction given from the control unit 401, the uplink signal generated by the transmission signal generator unit 402 to the resources (e.g., the PUSCH resource and the PUCCH resource), and outputs the mapped uplink signal to the transmission/reception unit 203. The mapping unit 403 can be constituted as a mapper, a mapping circuit or a mapping device, which are described based on the common recognition in the technical field according to the present invention.

The reception signal processor unit 404 executes the reception process (such as de-mapping, demodulation and decoding) for the reception signal inputted from the transmission/reception unit 203. The reception signal is exemplified by the downlink signal (the downlink control signal, the downlink data signal, the downlink reference signal) transmitted from the radio base station 10. The reception signal processor unit 404 can be constituted as a signal processor, a signal processor circuit or a signal processor device, which are described based on the common recognition in the technical field according to the present invention.

The reception signal processor unit 404 outputs the information decoded by the reception process to the control unit 401. The reception signal processor unit 404 outputs, e.g., the broadcast information, the system information, the RRC signaling and the DCI to the control unit 401. The reception signal processor unit 404 outputs the reception signal and a post-reception-processing signal to the measurement unit 405.

The measurement unit 405 carries out the measurement with respect to the received signal. The measurement unit 405 can be constituted as a measurement instrument, a measurement circuit or a measurement device, which are described based on the common recognition in the technical field according to the present invention.

The measurement unit 405 may estimate the reception power (e.g., RSRP), the reception quality (e.g., RSRQ) and the channel state of the received signal. An estimation result may be outputted to the control unit 401.

<Hardware Constitution>

Note that the block diagrams used for describing the embodiments illustrate the blocks on a function basis. Those function blocks (function units) are attained by arbitrarily combining hardware and/or software. Means constituted to attain the respective function blocks are not particularly limited. To be specific, each function block may be attained by one physically integrated apparatus, and may also be attained by plural, i.e., two or more physically separated apparatuses that are interconnected by wire or wirelessly.

Figure 15:
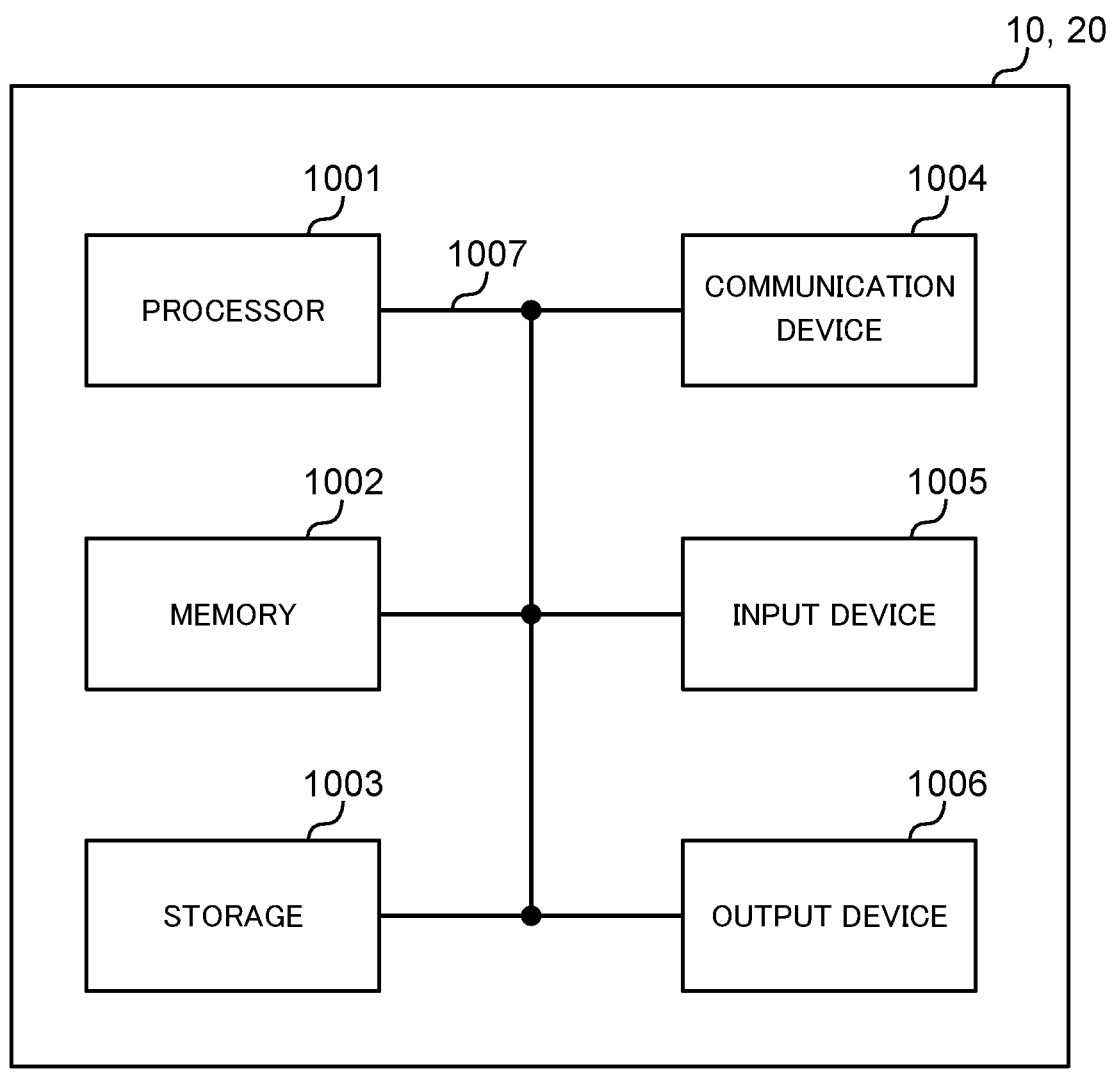
FIG. 15 is a diagram illustrating one example of hardware constitutions of the radio base station and the user terminal according to the embodiment.

For example, the radio base station, the user terminal and other equivalent apparatuses in embodiment of the present invention may each function as a computer that executes the processes of the radio communication method of the present invention. FIG. 15 is a diagram illustrating one example of a hardware constitution of each of the radio base station and the user terminal according to one embodiment of the present invention. the radio base station 10 and the user terminal 20 described above may be each physically constituted as a computer apparatus including a processor 1001, a memory 1002, a storage 1003, a communication device 1004, an input device 1005, an output device 1006, and a bus 1007.

Note that a term "apparatus or device" may be replaced in wording by the circuit, the device and the unit in the following discussion. Each of the radio base station 10 and the user terminal 20 may be constituted hardware wise to include one or plural devices illustrated in the drawing, and may also be hardware wise constituted not to include part of these devices.

The respective functions of the radio base station 10 and the user terminal 20 are attained by causing the processor 1001 to read predetermined software (program) onto the hardware such as the memory 1002, and causing the processor 1001 to perform computing, thereby controlling the communications of the communication device 1004 and read and/or write of the data from and/or to the memory 1002 and the storage 1003.

The processor 1001 controls, e.g., the whole computer by operating an Operating System (OS). The processor 1001 may be constituted as a central processing unit (CPU:

Central Processing Unit) including interfaces with peripheral devices, a control device, an arithmetic device and a register. For example, the baseband signal processor unit 104 (204), the call processor unit 105 and other equivalent units may also be attained by the processor 1001.

The processor 1001 reads the program (program codes), the software modules and the data into the memory 1002 from the storage 1003 and/or the communication device 1004, and executes a variety of processes according to these software components. The program involves using a program compiled to cause the computer to execute at least part of the operations described in the embodiments described above. For example, the control unit 401 of the user terminal 20 may be attained by a control program stored in the memory 1002 and running on the processor 1001, and other function blocks may be attained in the same way.

The memory 1002 is a (non-transitory) A computer readable recording medium, and may be constituted as at least one of a ROM (Read-Only Memory), an EPROM (Erasable Programmable ROM) and a RAM (Random Access Memory). The memory 1002 may be called a register, a cache, or a main memory (main storage device). The memory 1002 is capable of storing a program (program codes) and software modules, which are executable for carrying out the radio communication method according to one embodiment of the present invention.

The storage 1003 is a (non-transitory) computer readable recording medium, and may be constituted as at least one of an optical disc, such as a CD-ROM (Compact Disc-ROM), a hard disc drive, a flexible disk, a magneto-optical disk, and a flash memory. The storage 1003 may be called an auxiliary storage device.

The communication device 1004 is a hardware component (transmission/reception device) for performing the communications between the computers via a wired and/or radio network, and is also called, e.g., a network device, a network controller, a network card, or a communication module. For example, the foregoing transmission/reception antenna 101 (201), the amplifier unit 102 (202), the transmission/reception unit 103 (203) and the transmission path interface 106 may be attained by the communication device 1004.

The input device 1005 is an input device (e.g., a keyboard, a mouse) that accepts an input from outside. The output device 1006 is an output device (e.g., a display, a loudspeaker) that performs output to the outside. Note that the input device 1005 and the output device 1006 may also be integrally constituted (e.g., a touch panel).

The respective devices such as the processor 1001 and the memory 1002, are interconnected via a bus 1007 for communicating the information. The bus 1007 may be constituted as a single bus, and may also be constituted as buses that are different between the devices.

Each of the radio base station 10 and the user terminal may be constituted to include the hardware such as a microprocessor, a digital signal processor (DSP: Digital Signal Processor), an ASIC (Application Specific Integrated Circuit), a PLD (Programmable Logic Device), and an FPGA (Field Programmable Gate Array), and part or the whole of the function blocks may be attained by these hardware components. For example, the processor 1001 may be implemented by at least one of these hardware components.

Note that the terminologies explained in the present specification and/or the terminologies available for comprehending the present specification may be replaced with terminologies having the same or similar meanings. For example, the channel and/or the symbol may be defined as the signal (signaling). The signal may be defined as a message. The component carrier (CC) may be called a cell, a frequency carrier, a carrier frequency and other equivalent technical terms.

The radio frame may be constituted by one or plural periods (frames) in the time domain. One or plural periods (frames) constituting the radio frame may be called subframes. The subframe may be constituted as one or plural slots in the time domain. The slot may be constituted as one or plural symbols (OFDM symbols, SC-FDMA symbols) in the time domain.

Each of the radio frame, the subframe, the slot and the symbol represents the time unit when transmitting the signal. The radio frame, the subframe, the slot and the symbol may be given other terms corresponding thereto. For example, one subframe may be called a transmission time interval (TTI: Transmission Time Interval); a plurality of consecutive subframes may be called TTIs; and one slot may be called a TTI. In other words, each of the subframe and the TTI may also be the subframe (1 ms) in the existing LTE, may also be a period (e.g., 1 to 13 symbols) shorter than 1 ms, and may further be a period longer than 1 ms.

TTI denotes herein a minimum time unit of scheduling in the radio communications. For example, in the LTE system, the radio base station performs scheduling for allocating, on a TTI-by-TTI basis, the radio resources (the frequency bandwidths and the transmission power usable in the respective user terminals) to the user terminals. Note that the TTI is not limited to this definition.

The TTI having a time length of 1 ms may also be called a normal TTI (TTI in LTE Rel.8-12), a normal TTI, a long TTIs, a normal subframe, a normal subframe or a long subframe. The TTI shorter than the normal TTI may be called a reduced TTI, a short TTI, a reduced subframe or a short subframe.

The resource block (RB: Resource Block) is a resource allocation unit of the time domain and the frequency domain, and may contain one or plural consecutive subcarrier waves (subcarriers) in the frequency domain. The RB may also contain one or plural symbols in the time domain, and may have a length equivalent to one slot, one subframe or one TTI. Each of one TTI and one subframe may be constituted as one or plural resource blocks. Note that the RB may be called a physical resource block (PRB: Physical RB), a PRB pair or an RB pair.

The resource block may be constituted as one or plural source elements (RE: Resource Element). For example, one RE may be a radio resource region of one subcarrier and one symbol.

Structures of the radio frame, the subframe, the slot and the symbol described above are merely exemplifications. For instance, a variety of modifications of constitutions regarding the number of subframes contained in the radio frame, the number of slots contained in the subframe, the number of symbols and RBs contained in the slot, the number of subcarriers contained in the RB, the number of symbols within the TTI, a symbol length and a length of cyclic prefix (CP: Cyclic Prefix) may be made.

The information, the parameters and other equivalents explained in the present specification may be expressed by absolute values, may also be expressed by relative values from a certain reference value, and may further be expressed by different types of information corresponding to thereto. For instance, the radio resource may be what is indicated by a certain index.

The information, the signal and other equivalents explained in the present specification may also be expressed by making use of any of multiple different technologies. For example, the data, the instruction, the command, the information, the signal, the bit, the symbol, the chip and other equivalents, which are stated in the foregoing descriptions throughout, may be expressed by a voltage, an electric current, an electromagnetic wave, a magnetic field or a magnetic particle, a photo field or a photon, or by arbitrary combinations thereof.

The software, the instructions, the information and other equivalents may be transmitted and received via a transmission medium. For instance, when the software is transmitted from a web site, a server or other remote sources by employing wired (cable) technologies (a coaxial cable, an optical fiber cable, a twist pair or a digital subscriber line (DSL)) and/or wireless (radio) technologies (infrared-rays, microwaves), the wired technologies and/or the wireless technologies are encompassed within definitions of the transmission mediums.

The radio base station in the present specification may be replaced in wording by the user terminal. For example, The respective modes/embodiments of the present invention may be applied to a constitution of replacing the communications between the radio base station and the user terminal by communications between the plural user terminals (D2D: Device-to-Device). In this case, such a constitution may be taken that the user terminal 20 has the functions possessed by the radio base station 10. The terms "uplink" and "downlink" may be replaced in wording by "sides". For example, the uplink channel may be replaced in wording by a side channel.

Similarly, the user terminal in the present specification may be replaced in wording by the radio base station. In this case, such a constitution may also be taken that the radio base station 10 has the functions possessed by the user terminal 20 described above.

The respective embodiments discussed in the present specification may be solely used, may also be used in combination, and may further be used by being switched between along with the execution thereof. The notification of a certain item of information (e.g., the notification of "being X") may be made implicitly (e.g., this may be fulfilled by not making the notification of a certain item of information) without being limited to the explicit notification.

The notification of the information may be made by other methods without being limited to the embodiments discussed in the present specification. For example, the notification of the information may be carried out by the physical layer signaling (e.g., the DCI (Downlink Control Information), the UCI (Uplink Control Information)), the higher layer signaling (e.g., RRC (Radio Resource Control), the broadcast information (MIB (Master Information Block), SIB (System Information Block)), MAC (Medium Access Control) signaling), other signals or combinations thereof. The RRC signaling may be called an RRC message and may also be, e.g., an RRC connection setup (RRCConnectionSetup) message and an RRC connection reconfiguration (RRCConnectionReconfiguration) message. The MAC signaling may be signaled by, e.g., a MAC control element (MAC CE (Control Element)).

The embodiments discussed in the present specification may be applied to systems utilizing the existing systems, and/or next generation systems being scalable based on these existing systems such as LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and systems using other proper radio communication methods and/or a next generation system extended (scaled out) based on these systems.

The processing procedures, sequences and flowcharts in the embodiments discussed in the present specification may be replaced in order unless contradictory. For instance, the method described in the present specification exhibits elements of a variety of steps in an exemplary order, but the embodiment is not limited to the specified order.

The detailed description of the present invention has been described so far, however, it is apparent to persons skilled in the art that the present invention is not limited to the embodiments discussed in the present specification. For example, the respective embodiments may be solely used, and may also be used in combination. The present invention can be carried out by way of amended and modified embodiments without departing from the spirit and scope of the present invention, which are defined by the description of the scope of claims. The description of the present specification is therefore intended for illustrative explanation only and does not impose any limited interpretation on the present invention.

It is to be noted that the present apo cation is based on Japanese Patent application No. 2016-020311 filed on Feb. 4, 2016, and the entire content thereof is incorporated by reference in the present specification.

The invention claimed is:

1. A user terminal transmitting retransmission control information of a downlink shared channel, the user terminal comprising:
   a receiver that receives downlink control information; and
   a processor that determines, based on the downlink control information, a single subcarrier that is used for transmission of the retransmission control information from a plurality of subcarriers that are limited to be less than a maximum number of subcarriers available to the user terminal.

2. The user terminal according to claim 1, wherein the downlink control information is used for allocation of the downlink shared channel.

3. The user terminal according to claim 2, wherein the user terminal transmits the retransmission control information by using an uplink shared channel.

4. The user terminal according to claim 2, wherein a subcarrier spacing of the single subcarrier is 15 kHz or 3.75 kHz.

5. The user terminal according to claim 2, wherein the user terminal supports NB-IoT (Narrow Band Internet of Things).

6. The user terminal according to claim 1, wherein the user terminal transmits the retransmission control information by using an uplink shared channel.

7. The user terminal according to claim 6, wherein a subcarrier spacing of the single subcarrier is 15 kHz or 3.75 kHz.

8. The user terminal according to claim 6, wherein the user terminal supports NB-IoT (Narrow Band Internet of Things).

9. The user terminal according to claim 1, wherein a subcarrier spacing of the single subcarrier is 15 kHz or 3.75 kHz.

10. The user terminal according to claim 9, wherein the user terminal supports NB-IoT (Narrow Band Internet of Things).

11. The user terminal according to claim 1, wherein the user terminal supports NB-IoT (Narrow Band Internet of Things).

12. A radio base station receiving retransmission control information of a downlink shared channel from a user terminal, the radio base station comprising:
a transmitter that transmits downlink control information; and
a processor that controls retransmission of the downlink shared channel based on the retransmission control information,
wherein the radio base station receives the retransmission control information by using a single subcarrier that is determined, based on the downlink control information, from a plurality of subcarriers that are limited to be less than a maximum number of subcarriers available to the user terminal.

13. A radio communication method for a user terminal transmitting retransmission control information of a downlink shared channel, the radio communication method comprising:
receiving downlink control information; and
determining, based on the downlink control information, a single subcarrier that is used for transmission of the retransmission control information from a plurality of subcarriers that are limited to be less than a maximum number of subcarriers available to the user terminal.

* * * * *